United States Patent
Furubayashi

(10) Patent No.: US 8,964,227 B2
(45) Date of Patent: Feb. 24, 2015

(54) PRINT SERVER, PRINT DATA TRANSMISSION METHOD, AND NON-TRANSITORY COMPUTER-READABLE RECORDING MEDIUM ENCODED WITH PRINT DATA TRANSMISSION PROGRAM

(71) Applicant: Konica Minolta, Inc., Chiyoda-ku (JP)

(72) Inventor: Toshiya Furubayashi, Takarazuka (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/933,168

(22) Filed: Jul. 2, 2013

(65) Prior Publication Data

US 2014/0009790 A1  Jan. 9, 2014

(30) Foreign Application Priority Data

Jul. 6, 2012 (JP) ................................. 2012-152381

(51) Int. Cl.
 *G06F 3/12* (2006.01)
(52) U.S. Cl.
 CPC ............ *G06F 3/1224* (2013.01); *G06F 3/1212* (2013.01); *G06F 3/1236* (2013.01); *G06F 3/1288* (2013.01)
 USPC ...................................................... 358/1.15
(58) Field of Classification Search
 USPC ....................................................... 358/1.15
 See application file for complete search history.

(56) References Cited

U.S. PATENT DOCUMENTS

2005/0120086 A1* 6/2005 Kim .............................. 709/206
2012/0069391 A1* 3/2012 Yonezawa et al. ........... 358/1.15

FOREIGN PATENT DOCUMENTS

JP 2006-099714 A 4/2006
JP 2009-151444 A 7/2009

OTHER PUBLICATIONS

Machine translation for JP 2006-099714, IDS.*

* cited by examiner

*Primary Examiner* — Qian Yang
(74) *Attorney, Agent, or Firm* — Buchanan Ingersoll & Rooney PC

(57) ABSTRACT

A print server includes a temporary storage portion to temporarily store externally received print data, an extraction portion to extract a set of one or more print data serving as a transmission target from the temporarily stored print data, a print data transmission portion to successively transmit one or more print data included in the extracted set without transmitting two or more simultaneously to a requestor apparatus that has transmitted a request, and a hold portion. If a plurality of sets are extracted by the extraction portion while print data is being transmitted, and if there exist one or more not-yet-transmitted data among one or more print data included in the same set as the print data being transmitted, the hold portion holds transmission of not-yet-transmitted data after transmission of the print data being transmitted is completed.

15 Claims, 15 Drawing Sheets

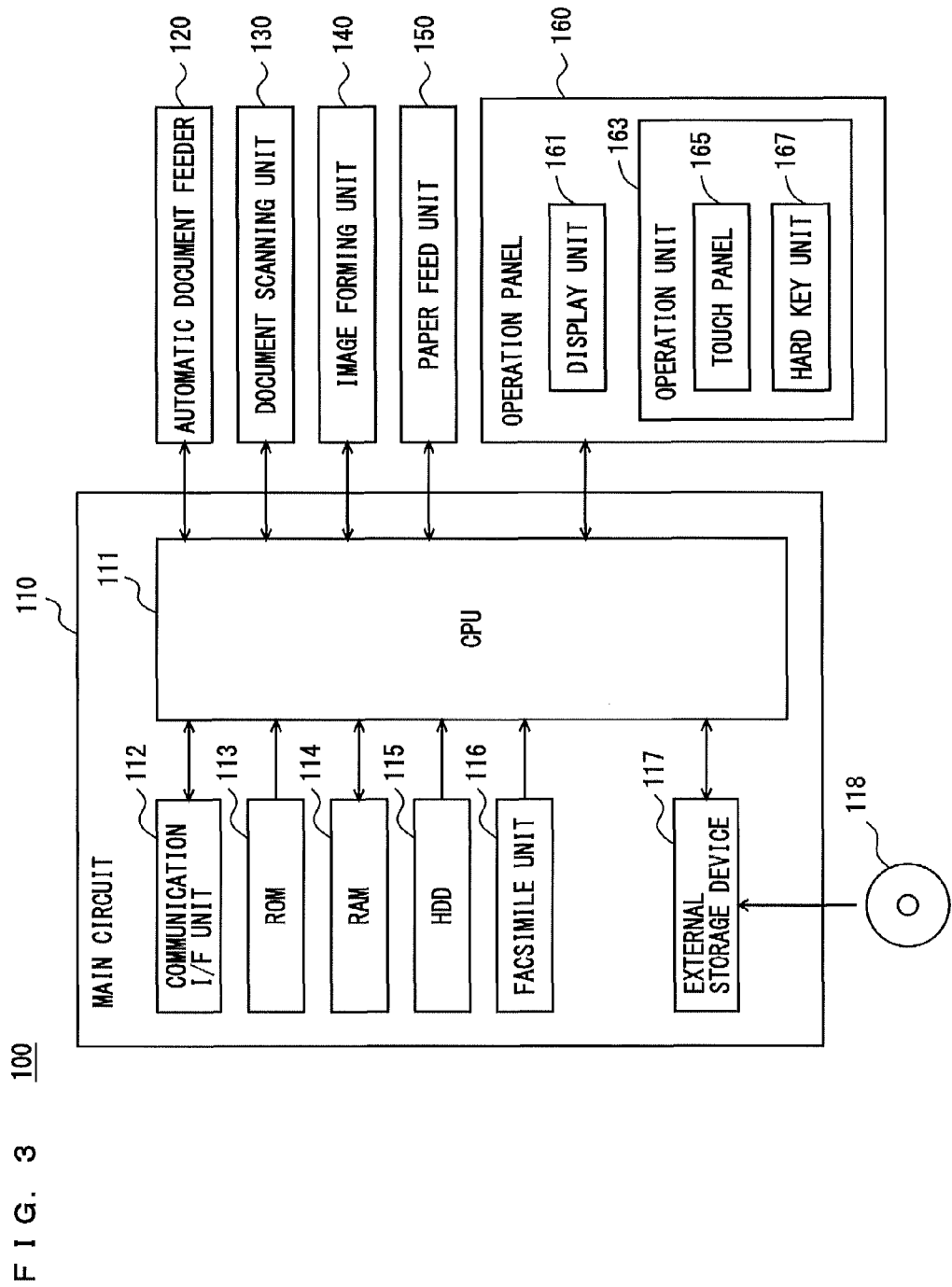
F I G. 3

PRINT SERVER, PRINT DATA TRANSMISSION METHOD, AND NON-TRANSITORY COMPUTER-READABLE RECORDING MEDIUM ENCODED WITH PRINT DATA TRANSMISSION PROGRAM

This application is based on Japanese Patent Application No. 2012-152381 filed with Japan Patent Office on Jul. 6, 2012, the entire content of which is hereby incorporated by reference.

BACKGROUND OF THE INVENTION

1. Field of the Invention

The present invention relates to a print server, a print data transmission method, and a non-transitory computer-readable recording medium encoded with a print data transmission program. More specifically, the present invention relates to a print server that transmits print data to an image forming apparatus, a print data transmission method executed in the print server, and a non-transitory computer-readable recording medium encoded with a print data transmission program.

2. Description of the Related Art

There are known print systems in which print data transmitted from a personal computer (hereinafter referred to as a PC) is not immediately printed by an image forming apparatus such as a Multi-Functional Peripheral but temporarily stored into a print server, and at a time when a user log in to the image forming apparatus, the image forming apparatus downloads the print data for printing.

In this print system, print data may be transmitted simultaneously to a plurality of image forming apparatuses from a print server. In this case, the load on the print server increases. The increase of load on the print server may delay transmission of print data to each of the image forming apparatuses and delay the start of printing of the print data in all of the image forming apparatuses.

Japanese Patent Laid-Open No. 2006-099714 describes a system including a print management server and a plurality of print servers, in which print data is stored in a distributed manner into the print servers, and the print management server manages the print data stored in a distributed manner in the print servers, whereby load is distributed over the print servers.

In the conventional system, however, a plurality of print servers have to be provided, and, in addition, a print management server for managing the print servers has to be provided. This increases the cost.

SUMMARY OF THE INVENTION

In order to solve the above-noted object, a print server according to an aspect of the present invention includes a print data reception portion to externally receive print data; a temporary storage portion to temporarily store the received print data; an extraction portion to, in response to reception of a request from any one of a plurality of image forming apparatuses, extract a set of one or more print data serving as a transmission target from the temporarily stored print data based on the request; a print data transmission portion to successively transmit one or more print data included in the extracted set without transmitting two or more simultaneously to a requestor apparatus that has transmitted the request among the plurality of image forming apparatuses; and a timing control portion to, if a plurality of sets are extracted by the extraction portion while print data is being transmitted by the print data transmission portion, control timing for transmitting respective one or more print data included in the plurality of sets. The timing control portion includes a hold portion wherein if there exist one or more not-yet-transmitted data that have not yet been transmitted among one or more print data included in a same set as the print data being transmitted, the hold portion holds transmission of the one or more not-yet-transmitted data included in the same set as the print data being transmitted after transmission of the print data being transmitted is completed.

According to another aspect of the present invention, a print data transmission method includes: a print data reception step of externally receiving print data; a temporary storage step of temporarily storing the received print data; an extraction step of, in response to reception of a request from any one of a plurality of image forming apparatuses, extracting a set of one or more print data serving as a transmission target from the temporarily stored print data based on the request; a print data transmission step of successively transmitting one or more print data included in the extracted set without transmitting two or more simultaneously to a requestor apparatus that has transmitted the request among the plurality of image forming apparatuses; and a timing control step of, if a plurality of sets are extracted in the extraction step while print data is being transmitted in the print data transmission step, controlling timing for transmitting respective one or more print data included in the plurality of sets. The timing control step includes a hold step wherein if there exist one or more not-yet-transmitted data that have not yet been transmitted among one or more print data included in a same set as the print data being transmitted, transmission of the one or more not-yet-transmitted data included in the same set as the print data being transmitted is held after transmission of the print data being transmitted is completed.

According to a further aspect of the present invention, a non-transitory computer-readable recording medium is encoded with a print data transmission program performed by a computer controlling a print server. The print data transmission program causes the computer to execute: a print data reception step of externally receiving print data; a temporary storage step of temporarily storing the received print data; an extraction step of, in response to reception of a request from any one of a plurality of image forming apparatuses, extracting a set of one or more print data serving as a transmission target from the temporarily stored print data based on the request; a print data transmission step of successively transmitting one or more print data included in the extracted set without transmitting two or more simultaneously to a requestor apparatus that has transmitted the request among the plurality of image forming apparatuses; and a timing control step of, if a plurality of sets are extracted in the extraction step while print data is being transmitted in the print data transmission step, controlling timing for transmitting respective one or more print data included in the plurality of sets. The timing control step includes a hold step wherein if there exist one or more not-yet-transmitted data that have not yet been transmitted among one or more print data included in a same set as the print data being transmitted, transmission of the one or more not-yet-transmitted data included in the same set as the print data being transmitted is held after transmission of the print data being transmitted is completed.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 3 is a block diagram showing an example of an overall hardware configuration of the MFP.

DESCRIPTION OF THE PREFERRED EMBODIMENTS

Figure 1:
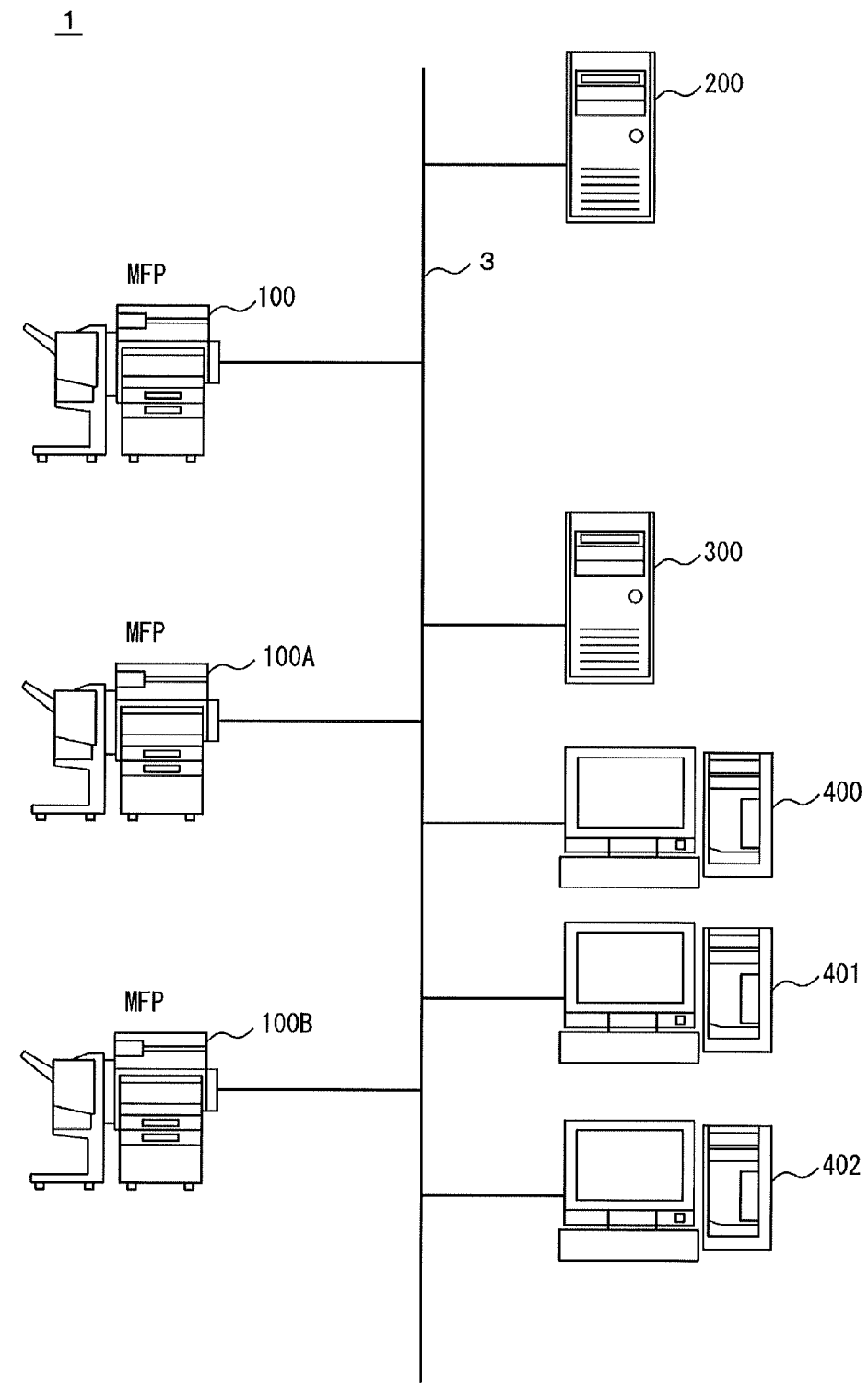
FIG. 1 is a diagram showing an overview of a print system in an embodiment of the present invention.

Embodiments of the present invention will be described below with reference to the figures. In the following description, the same parts are denoted with the same reference numerals. Their names and functions are also the same. A detailed description thereof is therefore not repeated.

FIG. 1 is a diagram showing an overview of a print system in an embodiment of the present invention. Referring to FIG. 1, a print system 1 includes Multi-Functional Peripherals (hereinafter referred to as "MFP") 100, 100A, 100B as image forming apparatuses, a print server 200, an authentication server 300, and personal computers (hereinafter referred to as "PC") 400 to 402, each connected to a network 3. In the figure, three MFPs 100, 100A, 100B are connected to network 3, by way of example. The number of MFPs is not limited to thereto as long as one or more MFPs are provided. MFPs 100, 100A, 100B may be replaced by any other devices having a function of forming an image, for example, such as facsimile machines and printers. Network 3 is a Local Area Network (LAN), either wired or wireless. Network 3 is not limited to a LAN and may be a Wide Area Network (WAN), a Public Switched Telephone Network (PSTN), or the Internet.

PCs 400 to 402, print server 200, and authentication server 300 are general computers. Authentication server 300 executes a process of authenticating users who use PCs 400 to 402 and MFPs 100, 100A, 100B. Authentication server 300 stores user data allocated for each user and including user identification information for identifying a user and authentication information. Authentication server 300 receives, from any one of PCs 400 to 402 and MFPs 100, 100A, 100B, user identification information and authentication information input thereto by a user and then compares the received user identification information and authentication information with user data stored beforehand. If they agree, authentication server 300 returns an authentication result indicating authentication success. If not agree, authentication server 300 returns an authentication result indicating authentication failure.

For example, a password is used as authentication information. Biometric information such as fingerprints, vein patterns, irises of users may be used for authentication. In this case, a reader for reading biometric information is connected to MFPs 100, 100A, 100B and PCs 400 to 402 each, and the user data stored in authentication server 300 includes user identification information and biometric information. MFPs 100, 100A, 100B and PCs 400 to 402 each receive the biometric information read by the reader. MFPs 100, 100A, 100B and PCs 400 to 402 each transmit the biometric information input from the reader to authentication server 300 to allow authentication server 300 to authenticate it.

It is noted that print server 200 may serve as authentication server 300, or PCs 400 to 402 and MFPs 100, 100A, 100B may each serve as authentication server 300. In this case, authentication server 300 is not necessary.

PCs 400 to 402 are each used by a user and executes an application program to execute various processes. The various processes include a login process of authenticating a user to use and a print process of generating print data and allowing any one of MFPs 100, 100A, 100B to print it.

In print system 1 in the present embodiment, a pull print driver program is installed in each of PCs 400 to 402. PCs 400 to 402 each executes the pull print driver program to temporarily store print data into print server 200. When the pull print driver program is installed, print server 200 is registered as a transmission destination of print data in each of PCs 400 to 402. For example, print server 200 is registered by setting the network address of print server 200.

PCs 400 to 402 each execute the pull print driver program to allow any one of MFPs 100, 100A, 100B to print the print data. Specifically, for example, in a case where a user A logs in to PC 400 with user identification information "taro1" and gives an instruction to print data designated by the user A, the pull print driver program transmits pull print data to print server 200. The pull print data includes print data generated by converting the data designated by the user into a print format, and the user identification information "taro1."

Print server 200 receives the pull print data including the user identification information and the print data from any one of PCs 400 to 402 and then temporarily stores the user identification information and the print data associated with each other. When the user A of the user identification information "taro1" logs in to any one of MFPs 100, 100A, 100B later, for example, if the user A logs in to MFP 100, then MFP 100 transmits an acquisition request including the user identification information "taro1" of the user A to print server 200. Print server 200 receiving the acquisition request transmits the print data associated with the user identification information "taro1" included in the acquisition request, from among the temporarily stored print data, to MFP 100 that has transmitted the acquisition request. MFP 100 prints the print data received from print server 200.

In addition to print data, print conditions such as the number of copies, the size of paper, color/monochrome, and print layout may be transmitted from any one of PCs 400 to 402. The print conditions are determined by PCs 400 to 402 based on the values accepted from users. Alternatively, PCs 400 to 402 may transmit only print data without transmitting the print conditions with print data, so that the print conditions may be designated at an MFP logged in to by the user, among MFPs 100, 100A, 100B, after the user logs in.

MFPs 100, 100A, 100B may have the same hardware configuration or may have different hardware configurations as long as they have an image forming unit for forming an image on a sheet such as paper based on image data. Although the hardware configuration of MFPs 100, 100A, 100B may not be the same, here, MFP 100 has a configuration that at least one of other MFPs 100A and 100B has.

Figure 2:
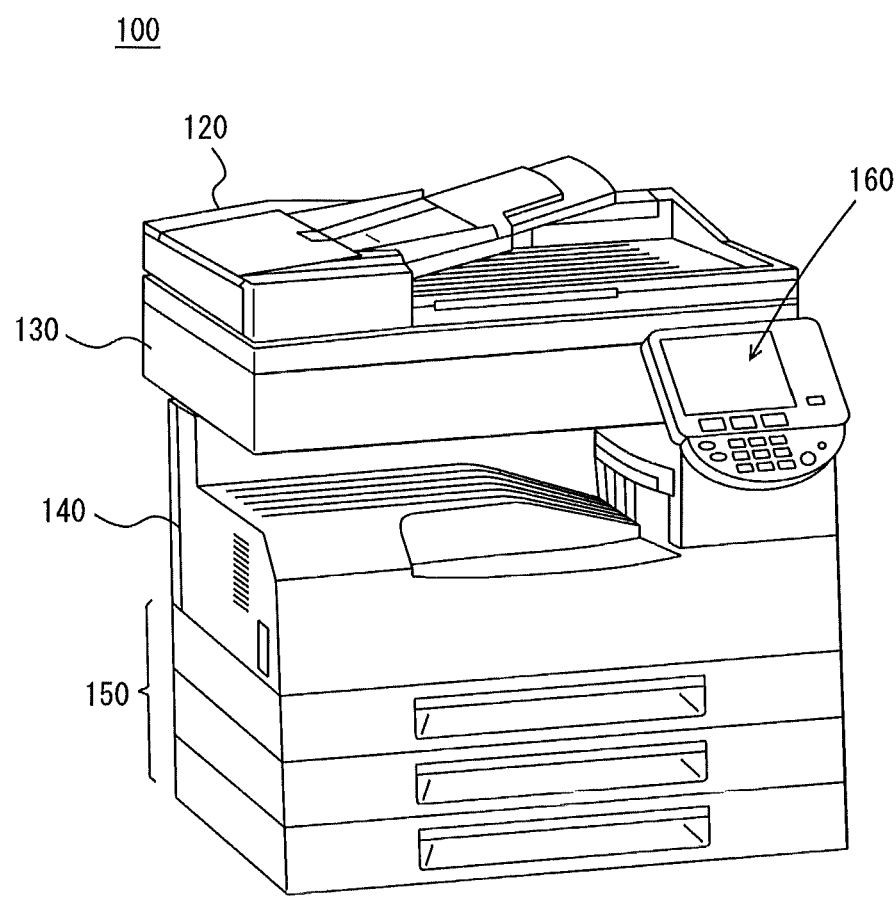
FIG. 2 is an external perspective view of an MFP in an embodiment of the present invention.

FIG. 2 is an external perspective view of the MFP in an embodiment of the present invention. Referring to FIG. 2, MFP 100 includes a document scanning unit 130 for scanning a document, an automatic document feeder 120 for conveying a document to document scanning unit 130, an image forming unit 140 for forming an image on a sheet based on image data output by document scanning unit 130 scanning a document, a paper feed unit 150 for supplying paper to image forming unit 140, and an operation panel 160 serving as a user interface.

Automatic document feeder 120 automatically conveys a plurality of sheets of document set on a document feed tray sheet by sheet to a predetermined document scanning position set on the platen glass of document scanning unit 130 and discharges the document having a document image scanned by document scanning unit 130 onto a document output tray. Document scanning unit 130 includes a light source for applying light to a document conveyed to the document scanning position and an optoelectronic transducer receiving light reflected by the document for scanning the document image according to the size of the document. The optoelectronic transducer converts the received light into image data that is an electrical signal, which is output to image forming unit 140. Paper feed unit 150 conveys paper accommodated in the paper feed tray to image forming unit 140.

Image forming unit 140, which forms an image by a well-known electrophotographic technique, forms an image on a sheet of paper conveyed by paper feed unit 150, based on processed image data obtained by performing a variety of data processing such as shading correction on image data input from document scanning unit 130, or image data externally received.

FIG. 3 is a block diagram showing an example of an overall hardware configuration of the MFP. Referring to FIG. 3, MFP 100 includes a main circuit 110. Main circuit 110 includes a CPU 111, a communication interface (I/F) unit 112, a ROM (Read Only Memory) 113, a RAM (Random Access Memory) 114, an HDD (Hard Disk Drive) 115 serving as a mass storage device, a facsimile unit 116, and an external storage device 117. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary to execute the program. RAM 114 is used as a working area for CPU 111 to execute a program. RAM 114 temporarily stores scan data successively sent from document scanning unit 130.

Facsimile unit 116 is connected to a PSTN (Public Switched Telephone Network) to transmit facsimile data to the PSTN or receive facsimile data from the PSTN. Facsimile unit 116 stores the received facsimile data into HDD 115 or converts the received facsimile data into print data printable in image forming unit 140 for output to image forming unit 140. Image forming unit 140 thus forms an image of the facsimile data received by facsimile unit 116 on a sheet of paper. Facsimile unit 116 also converts data (scan image) output by document scanning unit 130 scanning a document or data stored in HDD 115 into facsimile data and transmits the facsimile data to a facsimile machine connected to the PSTN.

Communication I/F unit 112 is an interface for connecting MFP 100 to network 3. Communication I/F unit 112 communicates with other MFPs 100A, 100B, PCs 400 to 402, print server 200, and authentication server 300 connected to network 3 via a communication protocol such as TCP (Transmission Control Protocol) or FTP (File Transfer Protocol). The protocol for communication is not particularly limited, and any protocol can be used. Network 3 to which communication I/F unit 112 is connected is, for example, a Local Area Network (LAN), either wired or wireless. Network 3 is not limited to a LAN but may be a Wide Area Network (WAN) or a network using Public Switched Telephone Network (PSTN). Network 3 is further connected to the Internet. MFP 100 thus can communication with a computer such as a server connected to the Internet.

External storage device 117 is controlled by CPU 111. A CD-ROM (Compact Disk Read Only Memory) 118 or a semiconductor memory is attached to external storage device 117. CPU 111 can access CD-ROM 118 or a semiconductor memory through external storage device 117. CPU 111 loads a program stored in CD-ROM 118 or a semiconductor memory attached to external storage device 117 into RAM 114 for execution. The program executed by CPU 111 is not limited to a program stored in CD-ROM 118, and a program stored in HDD 115 may be loaded into RAM 114 for execution. In this case, another computer connected to network 3 may overwrite the program stored in HDD 115 of MFP 100 or additionally write a new program through network 3 connected to communication I/F unit 112. MFP 100 may download a program from another computer connected to the network and store the program into HDD 115. The program referred to here includes not only a program directly executable by CPU 111 but also a source program, a compressed program, an encrypted program, and the like.

A medium encoded with a program executed by CPU 111 is not limited to CD-ROM 118 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

Operation panel 160 includes a display unit 161 and an operation unit 163. Display unit 161 is a display such as an LCD (Liquid Crystal Display) or an organic ELD (Electroluminescence Display) for displaying instruction menus to the user, information about the acquired image data, and the like. Operation unit 163 includes a touch panel 165 and a hard key unit 167 including a plurality of keys. The plurality of keys included in hard key unit 167 each include a contact switch which is connected to CPU 111. The user presses the hard key to close the contact thereby closing a circuit connected to CPU 111. The circuit is closed while the hard key is pressed by the user who operates MFP 100. The circuit is opened while the hard key is not pressed by the user.

When a plurality of keys of hard key unit 167 are pressed, operation unit 163 accepts input of instructions and data such as characters and numerals corresponding to the pressed keys.

Touch panel 165 is provided on the upper or lower surface of display unit 161 and outputs the coordinates of the position pressed by the user to CPU 111. Touch panel 165 detects the position pointed to by the user with a finger or stylus and outputs the coordinates of the detected position to CPU 111. Touch panel 165 preferably has a size equal or larger than the display surface of display unit 161. Touch panel 165 is superimposed on display unit 161. Therefore, the user designates the display surface of display unit 161 to allow touch panel 165 to output the coordinates of the position designated by the user on the display surface of display unit 161 to CPU 111. Touch panel 165 may employ any system, for example, such as a resistive film system, a surface acoustic wave system, an infrared system, an electromagnetic induction system, or an electrostatic capacity system.

Figure 4:
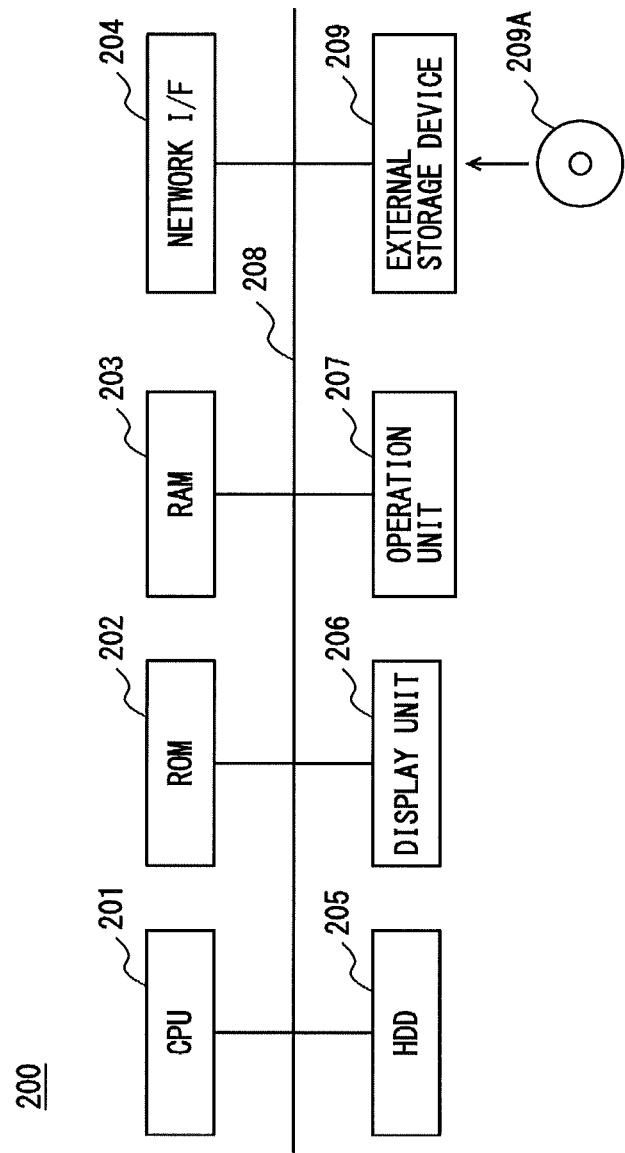
FIG. 4 is a block diagram showing an example of a hardware configuration of a print server.

FIG. 4 is a block diagram showing an example of a hardware configuration of the print server. Referring to FIG. 4, print server 200 includes a CPU 201 for controlling the entire print server 200, a ROM 202 for storing a program executed by CPU 201, a RAM 203 used as a working area of CPU 201, a network I/F 204 for connecting print server 200 to a network, an HDD 205 serving as a mass storage device, a display unit 206, an operation unit 207 for accepting input of user's operation, and an external storage device 209, each connected to a bus 208.

A CD-ROM 209A encoded with a program is attached to external storage device 209. CPU 201 loads a program stored in CD-ROM 209A into RAM 203 through external storage device 209 for execution. A medium encoded with a program is not limited to CD-ROM 209A but may be a flexible disk, a cassette tape, an optical disk (MO/MD/DVD), an IC card, an optical card, or a semiconductor memory such as a mask ROM, an EPROM, or an EEPROM. A program stored in HDD 205 may be loaded into RAM 203 for execution. In this case, print server 200 may download a program from another computer connected to network 3 and store the program into HDD 205. The program referred to here includes not only a program directly executable by CPU 201 but also a source program, a compressed program, an encrypted program, and the like.

Figure 5:
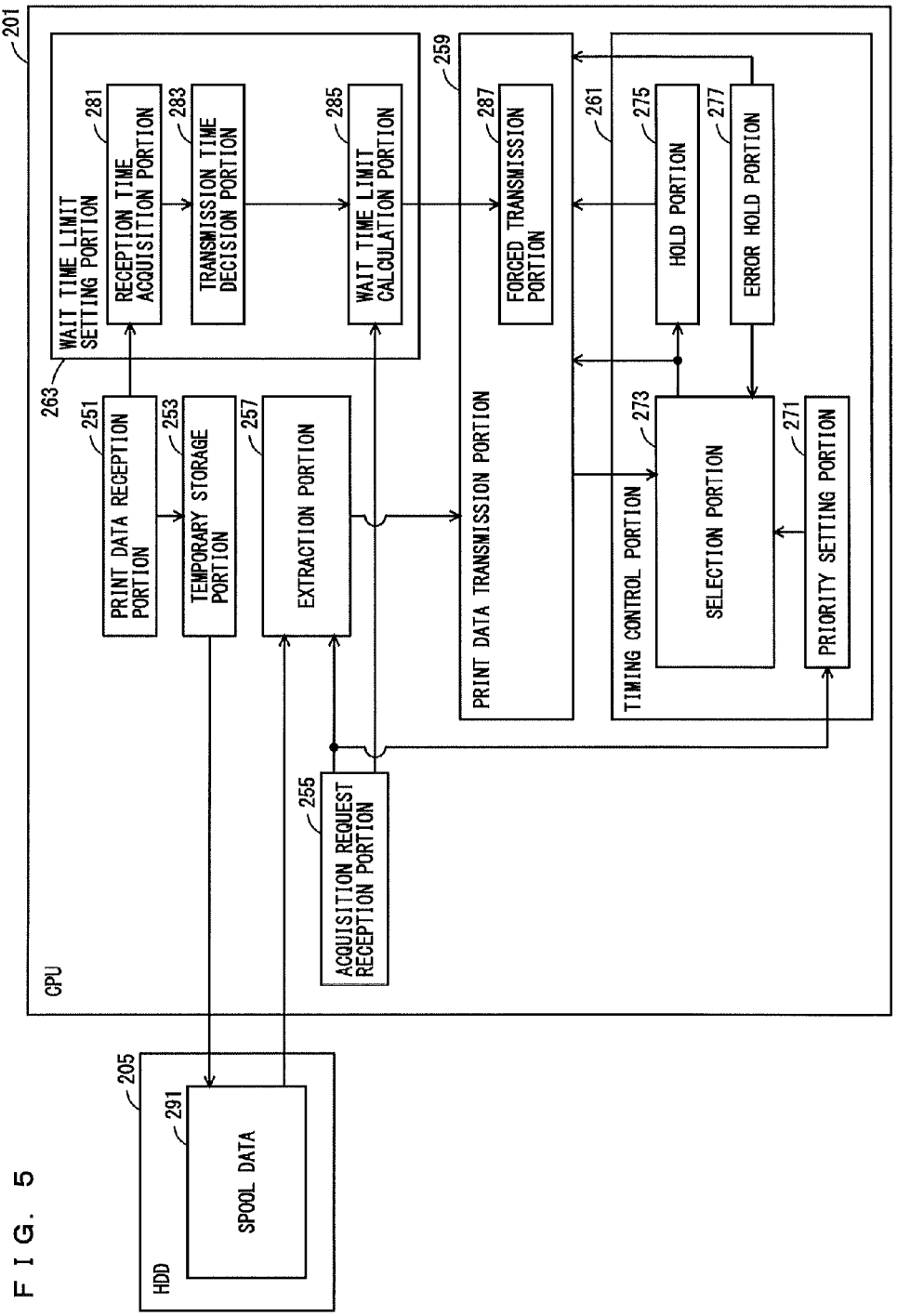
FIG. 5 is a block diagram showing an example of functions of a CPU of the print server.

FIG. 5 is a block diagram showing an example of functions of the CPU of the print server. The functions of CPU 201 of print server 200 shown in FIG. 5 are functions formed in CPU 201 by CPU 201 executing a print data transmission program stored in ROM 202, HDD 205, or CD-ROM 209A.

Referring to FIG. 5, CPU 201 of print server 200 includes a print data reception portion 251 externally receiving pull print data, a temporary storage portion 253 temporarily storing print data, an acquisition request reception portion 255 receiving an acquisition request, an extraction portion 257 extracting print data based on the acquisition request, a print data transmission portion 259 transmitting print data to an apparatus that has transmitted the acquisition request, a timing control portion 261, and a wait time limit setting portion 263.

Print data reception portion 251 controls network I/F 204 to receive pull print data including print data and user identification information from any one of PCs 400 to 402. Print data reception portion 251 receives pull print data and then outputs the received pull print data to temporary storage portion 253. Print data reception portion 251 also measures the time from the start to the end of reception of print data included in the pull print data and outputs the measured time associated with the print data, as a reception time, to wait time limit setting portion 263. For example, a set of the reception time and the print data identification information for identifying the print data is output to wait time limit setting portion 263.

Temporary storage portion 253 receives the pull print data input from print data reception portion 251 and stores the received pull print data into HDD 205. The pull print data is thus stored as spool data 291 in HDD 205. Spool data 291 includes print data and user identification information and associates the print data with the user identification information.

Acquisition request reception portion 255 controls network I/F 204 to receive an acquisition request from any one of MFPs 100, 100A, 100B. The operation of transmitting an acquisition request is the same among MFPs 100, 100A, 100B, and MFP 100 is therefore described as an example. When the user who operates MFP 100 logs in and authentication is successful, MFP 100 transmits an acquisition request including the user identification information of the login user to print server 200. The acquisition request received by acquisition request reception portion 255 from MFP 100 therefore includes the user identification information of the user who operates MFP 100.

Acquisition request reception portion 255 receives an acquisition request and then outputs a set of acquisition request identification information for identifying the acquisition request, the user identification information included in the acquisition request, and the apparatus identification information for identifying the apparatus that has transmitted the acquisition request, among MFPs 100, 100A, 100B, to extraction portion 257 and outputs a set of the acquisition request identification information and the apparatus identification information to an error hold portion 277.

In response to input of a set of the acquisition request identification information, the user identification information, and the apparatus identification information from acquisition request reception portion 255, extraction portion 257 extracts print data associated with the user identification information input from acquisition request reception portion 255 from among print data stored in HDD 205. Specifically, extraction portion 257 extracts spool data 291 that includes the user identification information input from acquisition request reception portion 255, from among spool data 291 stored in HDD 205, and acquires one or more print data included in each of the extracted one or more spool data 291. If a plurality of spool data 291 that include the user identification information input from acquisition request reception portion 255 are stored, extraction portion 257 extracts all of the plurality of spool data. Extraction portion 257 outputs a set of the acquired one or more print data, the acquisition request identification information, and the apparatus identification information to print data transmission portion 259 and outputs a set of one or more print data and the apparatus identification information to wait time limit setting portion 263.

Print data transmission portion 259 receives a set of one or more print data, the acquisition request identification information, and the apparatus identification information from extraction portion 257. Print data transmission portion 259 transmits the print data extracted based on the acquisition request to the apparatus that has transmitted the acquisition request among MFPs 100, 100A, 100B. Specifically, print data transmission portion 259 successively transmits one or more print data input from extraction portion 257 without transmitting two or more simultaneously to the apparatus specified by the apparatus identification information input from extraction portion 257, among MFPs 100, 100A, 100B. The order in which print data transmission portion 259 transmits one or more print data input from extraction portion 257 is not particularly limited. One or more print data may be transmitted in the order determined in accordance with a predetermined condition. For example, print data may be transmitted successively in order in which they are received, the earliest first.

Acquisition request reception portion 255 may receive a new acquisition request while print data transmission portion 259 is transmitting print data to any one of MFPs 100, 100A, 100B. Consequently, in this case, print data transmission portion 259 would transmit print data to a plurality of apparatuses that have transmitted the acquisition requests, among MFPs 100, 100A, 100B. However, the transmission of print data concurrently to those selected from among MFPs 100, 100A, 100B increases load on CPU 201.

If print server 200 concurrently transmits print data to those selected from MFPs 100, 100A, 100B, for example, the process of switching tasks (threads) may be increased in the operation system formed in CPU 201. If the number of tasks concurrently processed by the operation system reaches the limit in CPU 201, the task that exceeds the limit may be not be processed and enter the wait state. Moreover, CPU 201 may not be able to concurrently execute the process of accessing hardware such as RAM 203, HDD 205, external storage device 209, or network I/F 204. In such a case, the process of a plurality of tasks simultaneously accessing the same hardware may cause wait time in the other tasks excluding one.

Accordingly, print data transmission portion 259 basically transmits print data to one apparatus determined by timing control portion 261 from among MFPs 100, 100A, 100B. Print data transmission portion 259 outputs the acquisition request identification information corresponding to the print data being transmitted to timing control portion 261. The print data being transmitted by print data transmission portion 259 is hereinafter referred to as "data-in-transmission."

Timing control portion 261 controls timing for print data transmission portion 259 to transmit print data to each of a plurality of MFPs 100, 100A, 100B. Timing control portion 261 includes a priority decision portion 271, a selection portion 273, a hold portion 275, an error hold portion 277, and a forced transmission portion 287.

Priority decision portion 271 receives acquisition request identification information from extraction portion 257. In the case where acquisition request reception portion 255 receives a new acquisition request while print data transmission portion 259 is transmitting print data to any one of MFPs 100, 100A, 100B, the new acquisition request identification information is input from acquisition request reception portion 255. Priority decision portion 271 decides the respective priorities of a plurality of acquisition request identification information input from acquisition request reception portion 255, in the order in which they are input. In other words, priority decision portion 271 gives a higher priority to acquisition request identification information than to acquisition request identification information input later. Priority decision portion 271 outputs a set of the acquisition request identification information and the priority to selection portion 273.

Selection portion 273 receives a set of the acquisition request identification information and the priority from priority decision portion 271 and receives the acquisition request identification information corresponding to data-in-transmission from print data transmission portion 259. When transmission of print data being transmitted by print data transmission portion 259 is completed, selection portion 273 selects, as a transmission target set, the acquisition request identification information with a next higher priority to the priority corresponding to the acquisition request identification information corresponding to the data-in-transmission that is input from print data transmission portion 259. If the priority corresponding to the acquisition request identification information corresponding to the data-in-transmission that is input from print data transmission portion 259 is the lowest, selection portion 273 selects the acquisition request identification information with the highest priority as a transmission target set. Selection portion 273 outputs the acquisition request identification information selected as a transmission target set to print data transmission portion 259 and hold portion 275.

Upon completion of transmission of data-in-transmission, print data transmission portion 259 transmits print data selected from print data not yet transmitted, if there exist one or more print data not yet transmitted corresponding to the acquisition request identification information input from selection portion 273 and selected as a transmission target set. Specifically, print data transmission portion 259 specifies the one received at the earliest date and time among one or more print data not yet transmitted corresponding to the acquisition request identification information as the transmission target set input from selection unit 273.

If one or more print data not yet transmitted do not exist corresponding to the acquisition request identification information as the transmission target set input from selection portion 273, print data transmission portion 259 outputs a selection instruction to selection unit 273 and allows selection portion 273 to select the acquisition request identification information with the next highest priority as a transmission target set. Selection portion 273 receiving the selection instruction selects, as a transmission target set, the acquisition request identification information with the next highest priority to the acquisition request identification information previously selected as a transmission target set and outputs the newly selected acquisition request identification information to print data transmission portion 259 and hold portion 275.

In response to input of the acquisition request identification information as the transmission target set from selection portion 273, hold portion 275 holds transmission of respective one or more data not yet transmitted corresponding to all the acquisition request identification information excluding the acquisition request identification information as the transmission target set input from selection portion 273, among a plurality of acquisition request identification information input from acquisition request reception portion 255. Specifically, hold portion 275 outputs a transmission hold instruction to print data transmission portion 259. The hold instruction includes all the acquisition request identification information excluding the acquisition request identification information as the transmission target set input from selection portion 273, among a plurality of acquisition request identification information input from acquisition request reception portion 255.

When receiving a hold instruction from hold portion 275, print data transmission portion 259 does not transmit the respective one or more not-yet-transmitted print data corresponding to all the acquisition request identification information included in the hold instruction. When a hold instruction is input from hold portion 275, print data transmission portion 259 wait to transmit print data corresponding to the acquisition request included in the hold instruction and transmits only one selected from one or more print data corresponding to the acquisition request identification information selected as the transmission target set input from selection portion 273.

Error hold portion 277 monitors the status of all the apparatuses that have transmitted the acquisition requests, among MFPs 100, 100A, 100B. For example, error hold portion 277 monitors the status of each apparatus, based on MIB (Management Information Base) transmitted by each apparatus that has transmitted the acquisition request, among MFPs 100, 100A, 100B. When an apparatus that enters a state in which printing cannot be done is detected from the apparatuses that have transmitted the acquisition requests, among MFPs 100, 100A, 100B, error hold portion 277 specifies the acquisition request received from the apparatus in the state in which printing cannot be done, from among the acquisition requests received by acquisition request reception portion 255. Error hold portion 277 receives a set of the acquisition request identification information and the apparatus identification information from acquisition request reception portion 255. When an apparatus in a state in which printing cannot be done is detected, error hold portion 277 specifies the acquisition request identification information that makes a set with the apparatus identification information of the detected apparatus. Error hold portion 277 holds transmission of one or more data not yet transmitted corresponding to the specified acquisition request identification information. Specifically, error hold portion 277 outputs an error hold instruction to print data transmission portion 259. The error hold instruction includes the acquisition request identification information that makes a set with the apparatus identification information of the apparatus in the state in which printing cannot be done, among MFPs 100, 100A, 100B.

Error hold portion 277 also outputs the acquisition request identification information that makes a set with the apparatus identification information of the apparatus in the state in which printing cannot be done, among MFPs 100, 100A, 100B, to selection portion 273.

When the acquisition request identification information is input from error hold portion 277, selection portion 273 does not select the acquisition request identification information input from error hold portion 277. When the acquisition request identification information with the next highest priority to the priority corresponding to the acquisition request identification information corresponding to the data-in-transmission is the acquisition request identification information input from error hold portion 277, selection portion 273 selects the acquisition request identification information with the further next highest priority.

Wait time limit setting portion 263 includes a reception time acquisition portion 281, a transmission time decision portion 283, and a wait time limit calculation portion 285. Reception time acquisition portion 281 receives a set of the reception time and the print data identification information from print data reception portion 251. Reception time acquisition portion 281 outputs a set of the reception time and the print data identification information to transmission time decision portion 283. Transmission time decision portion 283 decides the reception time input from reception time acquisition portion 281 as the transmission time of print data specified by the print data identification information that makes a set therewith, and outputs a set of the transmission time and the print data identification information to wait time limit calculation portion 285.

Every time acquisition request reception portion 255 receives an acquisition request, wait time limit calculation portion 285 receives a set of one or more print data and the apparatus identification information from acquisition request reception portion 255. Every time print data reception portion 251 receives print data, wait time limit calculation portion 285 receives a set of the transmission time and the print data identification information from transmission time decision portion 267. Every time a set of one or more print data and the apparatus identification information is input from acquisition request reception portion 255, wait time limit calculation portion 285 calculates a wait time limit. Specifically, wait time limit calculation portion 285 acquires the ability information of the apparatus specified by the apparatus identification information input from acquisition request reception portion 255 and calculates the print time based on the ability information. The apparatus ability information is, for example, the time required for printing per sheet of paper. Wait time limit calculation portion 285 calculates the print time for each of one or more print data based on the acquired ability information. Wait time limit calculation portion 285 further calculates the wait time limit in accordance with the order of transmitting one or more print data. The order of transmitting one or more print data is, for example, the order of time in which the print data is received. Wait time limit calculation portion 269 sets a predetermined wait time limit for the first print data of one or more print data in the order of transmission. Wait time limit calculation portion 269 calculates the wait time limit for the second or subsequent print data of one or more print data in the order of transmission, based on the transmission time of the print data and the print time of the previous print data in the order of transmission. Specifically, the value obtained by subtracting the transmission time from the print time of the previous print data in the order of transmission is set as the wait time limit. Wait time limit calculation portion 269 calculates the wait time limit for each of one or more print data and then outputs a set of the print data identification information and the wait time limit to forced transmission portion 287.

Forced transmission portion 287 receives a set of the print data identification information and the wait time limit for each print data from wait time limit calculation portion 285. Forced transmission portion 287 receives the acquisition request identification information corresponding to the print data whose transmission is held, from hold portion 275. Forced transmission portion 287 counts, for each acquisition request identification information, the elapsed time since the end of transmission of print data that is transmitted lastly among one or more print data corresponding to the acquisition request identification information. Forced transmission portion 287 compares the elapsed time with the wait time limit that makes a set with the print data identification information of the print data to be transmitted subsequently to the print data transmitted lastly among one or more print data corresponding to the acquisition request identification information. When the elapsed time corresponding to the acquisition request identification information becomes equal to or greater than the wait time limit, forced transmission portion 287 receives the acquisition request identification information of the print data to be transmitted subsequently among one or more print data corresponding to that acquisition request identification information, from hold portion 275, and transmits that print data even if transmission is held. The transmission destination is the apparatus that has transmitted the acquisition request specified by the acquisition request identification information, among MFPs 100, 100A, 100B. In other words, the apparatus is specified by the apparatus identification information included in a set that includes the acquisition request identification information corresponding to the elapsed time reaching the wait time limit or greater, among the sets of one or more print data, the acquisition request identification information and the apparatus identification information input from extraction portion 257.

Figure 6:
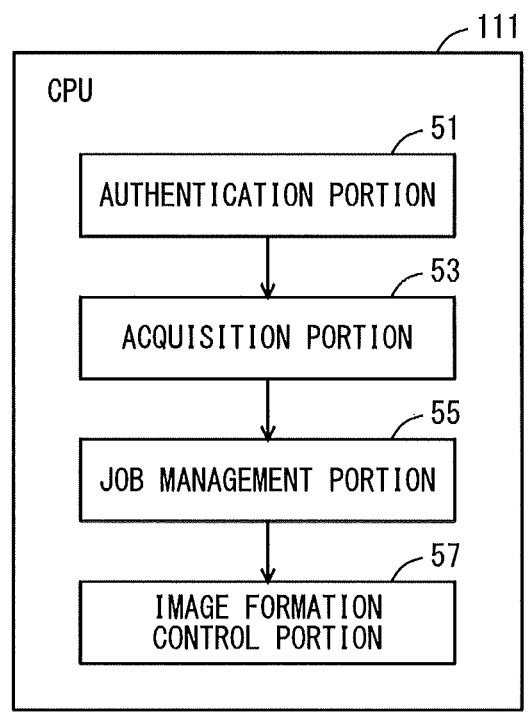
FIG. 6 is a block diagram showing an example of functions of a CPU of the MFP.

FIG. 6 is a block diagram showing an example of functions of the CPU of the MFP. The functions shown in FIG. 6 are formed in CPU 111 by CPU 111 of MFP 100 executing the pull print program stored in ROM 113, HDD 115 or CD-ROM 118.

Referring to FIG. 6, CPU 111 of MFP 100 includes an authentication portion 51 for authenticating a user who operates MFP 100, an acquisition portion 53 acquiring print data from print server 200, a job management portion 55 managing a print job, and an image formation control portion 57 controlling image forming unit 140.

Authentication portion 51 authenticates a user who operates MFP 100. Specifically, authentication portion 51 displays a login screen on display unit 161. The login screen includes a region for inputting user identification information and a region for inputting a password. When the user inputs user identification information and a password to operation unit 163, authentication portion 51 accepts the user identification information and password from operation unit 163 and transmits authentication information including the accepted user identification information and password to print server 200 through communication I/F unit 112 to allow print server 200 to authenticate it. Information of the transmission destination of the authentication information, specifically, the apparatus identification information of print server 200 is set by a user and stored into HDD 115 when the pull print program is installed in MFP 100.

When communication I/F unit 112 receives an authentication result from print server 200, authentication portion 51 accepts that authentication result. If the authentication result indicates authentication success, authentication portion 51 outputs the user identification information of the login user to acquisition portion 53. If the authentication result indicates authentication failure, authentication portion 51 displays an error message on display unit 161. If the authentication result indicates authentication success, authentication portion 51 accepts operation input to operation unit 161 as operation by the user authenticated and permitted to log in, until a logout instruction is subsequently input.

Acquisition portion 53 acquires print data related to the user authenticated by authentication portion 51. Specifically, acquisition portion 53 transmits an acquisition request including the user identification information to print server 200 in response to input of the user identification information from authentication portion 51. As described above, print server 200 receives the acquisition request, then specifies one or more print data associated with the user identification information included in the acquisition request, and returns the specified one or more print data. When communication I/F unit 112 receives print data from print server 200, acquisition portion 53 outputs the received print data to job management portion 55. When a plurality of print data are extracted, print server 200 successively transmits the plurality of print data, so that acquisition portion 53 outputs the print data to job management portion 55 in the order in which the plurality of print data are received.

Job management portion 55 receives the print data from acquisition portion 53, then generates a print job including the print data, and outputs the generated print job to image formation control portion 57. Image formation control portion 57 receives the print job from job management portion 55 and then prints the print data included in the print job. Specifically, image formation control portion 57 outputs the print data to image formation unit 140 to allow image formation unit 140 to form an image of the print data.

Figure 7:
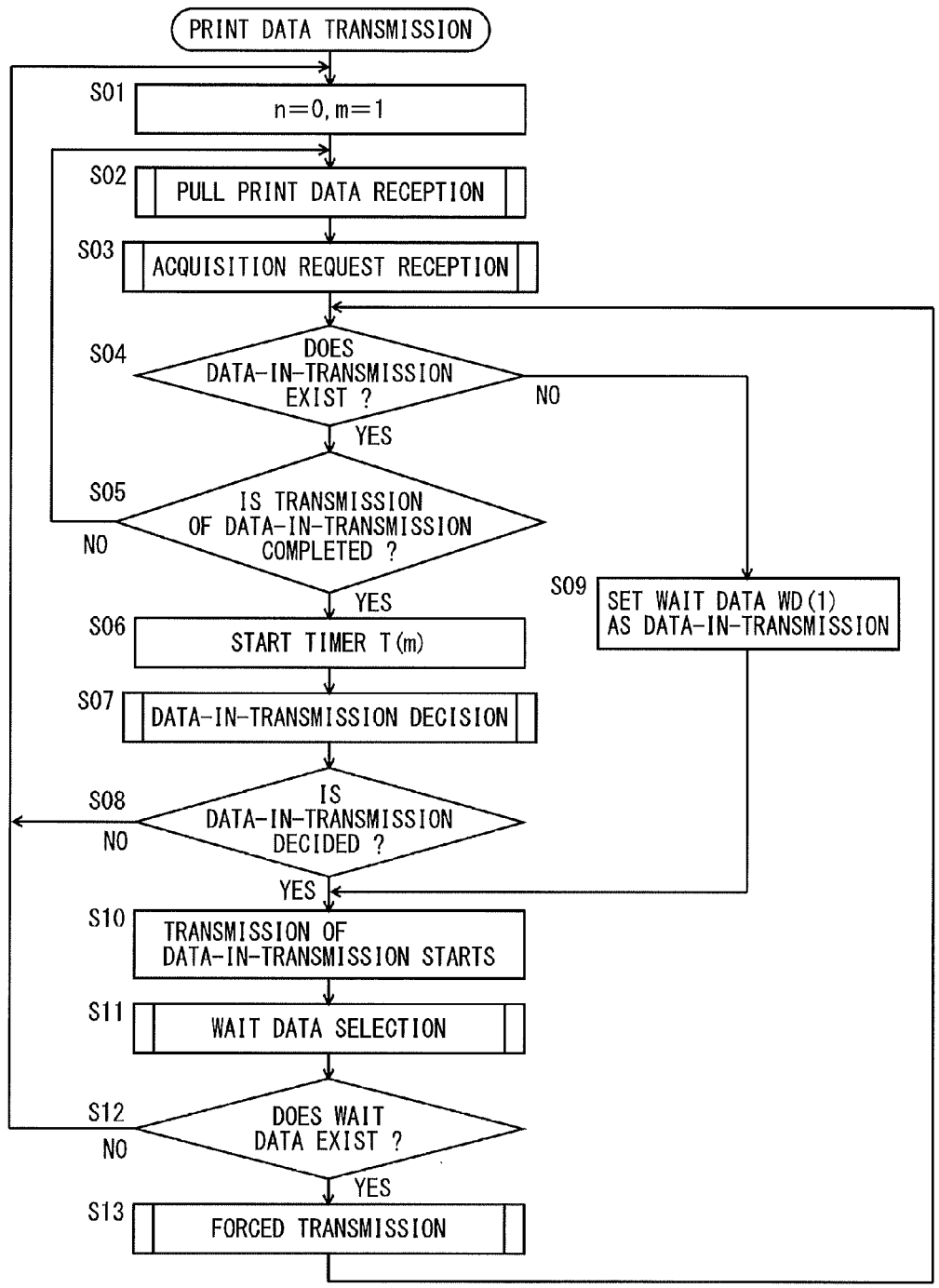
FIG. 7 is a flowchart showing an exemplary flow of a print data transmission process.

FIG. 7 is a flowchart showing an exemplary flow of a print data transmission process. The print data transmission process is a process executed by CPU 201 by CPU 201 of print server 200 executing the print data transmission program stored in ROM 202, HDD 205 or CD-ROM 209A.

Referring to FIG. 7, CPU 201 sets an initial value for a variable (step S01). Here, "0" is set for a variable n, and "1" is set for a variable m. The variable n is a variable for counting the number of acquisition requests received and is set for a request number (acquisition request identification information) for identifying an acquisition request every time an acquisition request is received. The request number thus indicates the order in which the acquisition request is received. The variable m is used to specify the acquisition request as a transmission target set.

In the next step S02, a print data reception process is executed. The print data reception process, which will be detailed later, is a process of receiving print data and user identification information from any one of PCs 400 to 402 and storing spool data 291 into HDD 205. In the next step S03, an acquisition request reception process is executed. The acquisition request reception process, which will be detailed later, is a process of receiving an acquisition request from any one of MFPs 100, 100A, 100B.

Figure 8:
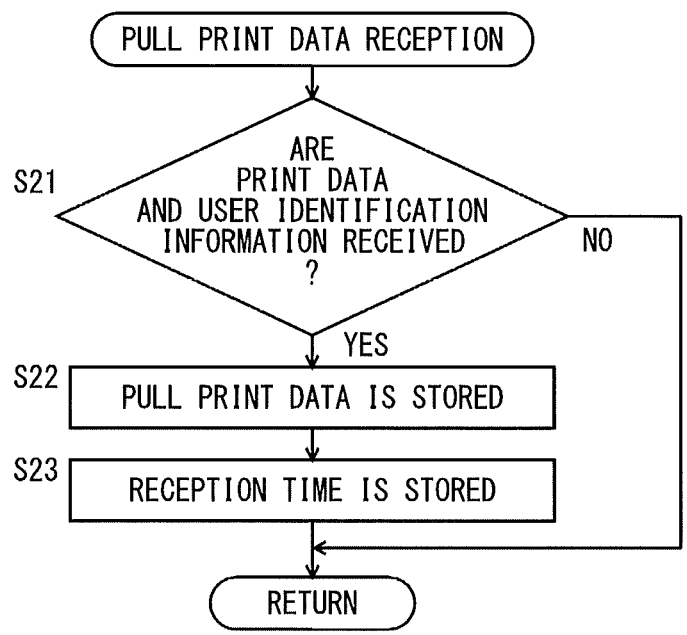
FIG. 8 is a diagram showing an exemplary flow of a print data reception process.

FIG. 8 is a diagram showing an exemplary flow of the print data reception process. Referring to FIG. 8, CPU 201 determines whether print data and user identification information are received (step S21). It is determined whether network I/F 204 receives print data and user identification information from any one of PCs 400 to 402. If print data and user identification information are received, the process proceeds to step S22. If not, the process returns to the print data transmission process.

In step S22, pull print data including the print data and the user identification information is stored into HDD 205. The process then proceeds to step S23. In step S23, the reception time is associated with the print data and stored. The process then returns to the print data transmission process. The reception time is a time from the start to the end of reception of print data.

Figure 9:
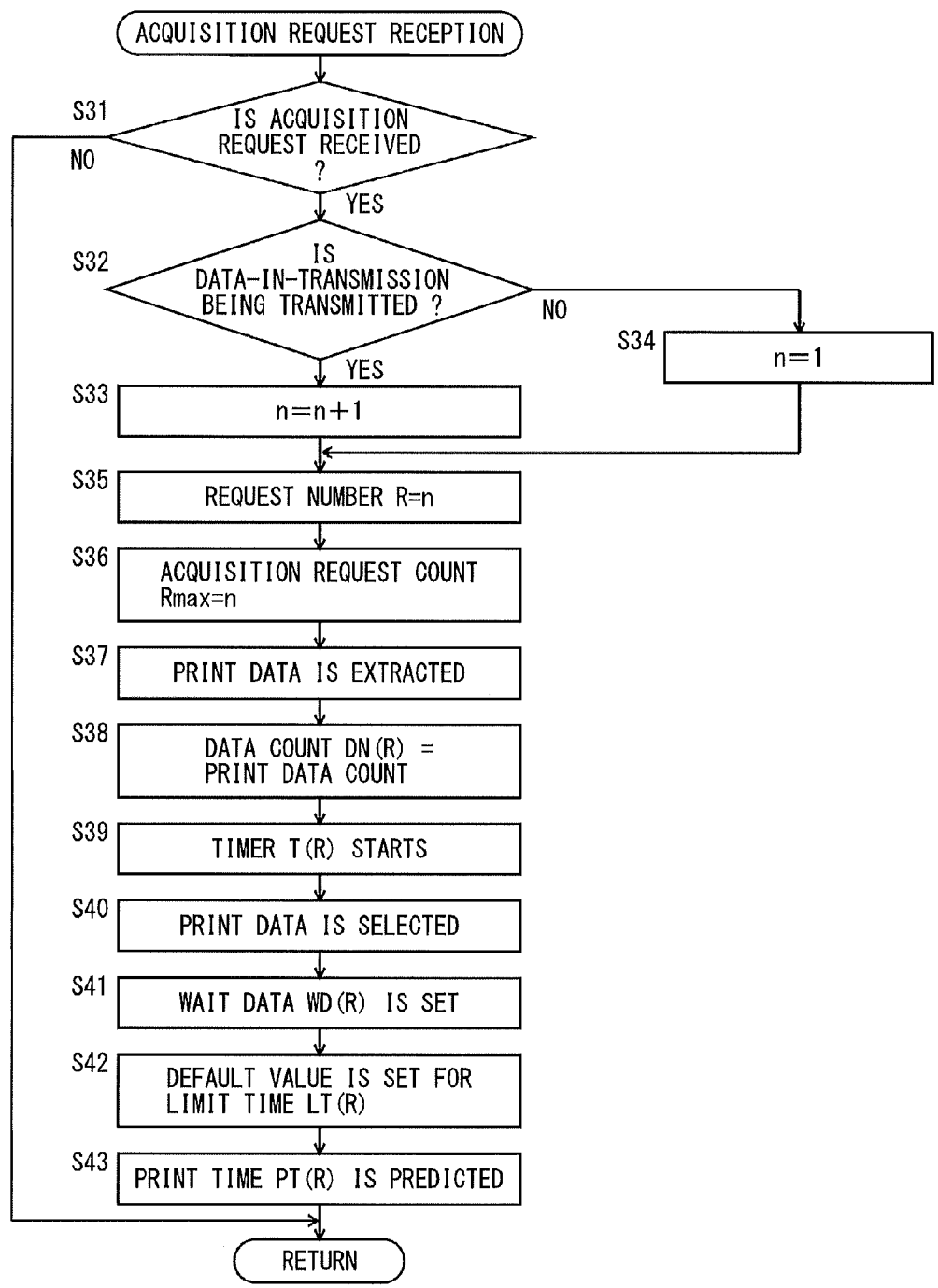
FIG. 9 is a flowchart showing an exemplary flow of an acquisition request reception process.

FIG. 9 is a flowchart showing an exemplary flow of the acquisition request reception process. Referring to FIG. 9, CPU 201 determines whether an acquisition request is received (step S31). It is determined whether network I/F 204 receives an acquisition request from any one of MFPs 100, 100A, 100B. If an acquisition request is received, the process proceeds to step S32. If not, the process returns to the print data transmission process.

In step S32, it is determined whether data-in-transmission is being transmitted. The data-in-transmission is print data that is decided by a data-in-transmission decision process executed in step S06 in FIG. 7 and is to be transmitted from network I/F 204 to any one of MFPs 100, 100A, 100B. If data-in-transmission is being transmitted, the process proceeds to step S33. If not, the process proceeds to step S34. In step S33, variable n is incremented by one, and the process proceeds to step S35. On the other hand, in step S34, "1" is set for variable n, and the process proceeds to step S35. That is, if data-in-transmission is not being transmitted at the time when an acquisition request is received in step S31, the received acquisition request is set as an acquisition request received first. If data-in-transmission is being transmitted at the time when an acquisition request is received in step S31, the received acquisition request is set as an acquisition request received subsequently to the previously received acquisition request.

In step S35, the value of the variable n is set for the request number R. The request number is acquisition request identification information for identifying the acquisition request received in step S31.

In the next step S36, the value of the variable n is set for an acquisition request count Rmax. The acquisition request count Rmax indicates the number of the received acquisition requests.

In step S37, print data that is associated with the user identification information included in the acquisition request received in step S31 is extracted. Specifically, spool data 291 is extracted that is stored in HDD 205 and includes the user identification information included in the acquisition request received in step S31. Spool data 291 includes user identification information and print data.

In the next step S38, the number of print data extracted in step S37 is set in a data count DN(R) that is an array. The data count DN(R) indicates the number of print data extracted for the acquisition request of the request number R.

In step S39, a timer T(R) is started. The timer T(R) corresponds to the acquisition request of the request number R. The timer T(R) started in step S39 counts the elapsed time since the acquisition request of the request number R is received. In step S40, one print data from among one or more print data extracted in step S37 is selected as a transmission target. The one received at the earliest date and time is selected from among one or more print data. The condition for selecting is not limited, and any other condition may be used for selection.

In the next step S41, print data identification information for identifying the print data selected in step S40 is set for wait data WD(R) that is an array. The wait data WD(R) indicates one print data selected as a transmission target in the acquisition request of the request number R.

In step S42, a default value is set for a limit time LT(R). The process then returns to the print data transmission process. The limit time LT(R) indicates the maximum time during which transmission of print data specified by the wait data WD(R) can be held. The default value set for the limit time LT(R) may be a value predetermined by the print data transmission program or may be a value set by the user.

In the next step S43, a print time PT(R) is predicted. The process then returns to the print data transmission process. The print time PT(R) is a time during which the print data specified by the wait data WD(R) is printed in the apparatus that has transmitted the acquisition request. First, an apparatus that has transmitted the acquisition request received in step S31 is specified from among MFPs 100, 100A, 100B. For example, it is assumed that the acquisition request is received from MFP 100. When the acquisition request is received from MFP 100, the ability information of MFP 100 is acquired, and the print time PT(R) is calculated based on the ability information. The ability information of MFP 100 is, for example, a time for printing one sheet of paper. The print time is calculated based on the ability information of MFP 100 and the number of prints of print data specified by the wait data WD(R).

One or more print data selected from among spool data 291 based on the acquisition request of the request number R is hereinafter referred to as one or more print data corresponding to the acquisition request having the request number R. Of one or more print data corresponding to the acquisition request having the request number R, the one not yet transmitted is referred to as not-yet-transmitted data. Of not-yet-transmitted data, the one selected as a transmission target to be transmitted firstly is referred to as wait data. The print data being transmitted is referred to as data-in-transmission.

Returning to FIG. 7, in step S04, it is determined whether data-in-transmission has been decided. Data-in-transmission is decided in step S07. If data-in-transmission has been decided in step S07, the process proceeds to step S05. If not, the process proceeds to step S09. In step S05, it is determined whether transmission of data-in-transmission is completed. If transmission of data-in-transmission by network I/F 204 is completed, the process proceeds to step S06. If not, the process returns to step S02.

In the next step S06, the timer T(m) is started. The process then proceeds to step S07. The timer T(m) corresponds to the acquisition request whose request number is m. The timer T(m) started in step S06 counts the elapsed time since transmission of data-in-transmission corresponding to the acquisition request having the request number m is started.

In step S07, the data-in-transmission decision process is executed. The process then proceeds to step S08. The data-in-transmission decision process, which will be detailed later, is a process of selecting one of wait data DW(i) as data-in-transmission. In step S08, it is determined whether data-in-transmission has been decided through the data-in-transmission decision process executed in step S07. If data-in-transmission has been decided, the process proceeds to step S10. If not, the process returns to step S01. At a stage when the data-in-transmission decision process is executed, no wait data WD(i) may exist. In such a case, data-in-transmission is not decided.

On the other hand, in step S09, wait data WD(1) is set as data-in-transmission. The process then proceeds to step S10. The wait data WD(1) is print data selected as a transmission target firstly from among one or more print data corresponding to the acquisition request having the request number "1."

In step S10, transmission of the data-in-transmission is started. Specifically, the data-in-transmission is transmitted through network I/F 204. The transmission destination is the apparatus that has transmitted the acquisition request corresponding to the data-in-transmission (print data), among MFPs 100, 100A, 100B. The transmission destination is the apparatus that has transmitted the acquisition request having the request number "1" among MFPs 100, 100A, 100B in the case where the process proceeds from step S09. The transmission destination is the apparatus that has transmitted the acquisition request having the request number m among MFPs 100, 100A, 100B in the case where the process proceeds from step S08.

In the next step S11, a wait data selection process is executed. The wait data selection process, which will be detailed later, is a process of setting new wait data WD(m) corresponding to the acquisition request having the request number m. That is, in the case where the variable m is "1," in step S08, the wait data WD(1) corresponding to the acquisition request having the request number "1" is decided as data-in-transmission. In the case where the variable m is not "1," in step S07, the wait data WD(m) corresponding to the acquisition request having the request number m is decided as data-in-transmission.

In step S12, it is determined whether there exists wait data. The wait data is print data set as the wait data WD(i) (where i is an integer equal to or greater than one and equal to or smaller than Rmax) in step S41 shown in FIG. 9. It is determined that wait data exists if there exists at least one wait data WD(i) corresponding to each of the acquisition requests having the request numbers 1 to Rmax. If none exists, it is determined that no wait data exists. If wait data exists, the process proceeds to step S13. If not, the process returns to step S01. That is, if no wait data exists, print data whose transmission is held does not exist.

In step S13, a forced transmission process is executed. The process then returns to step S11. The forced transmission process will be detailed later.

Figure 10:
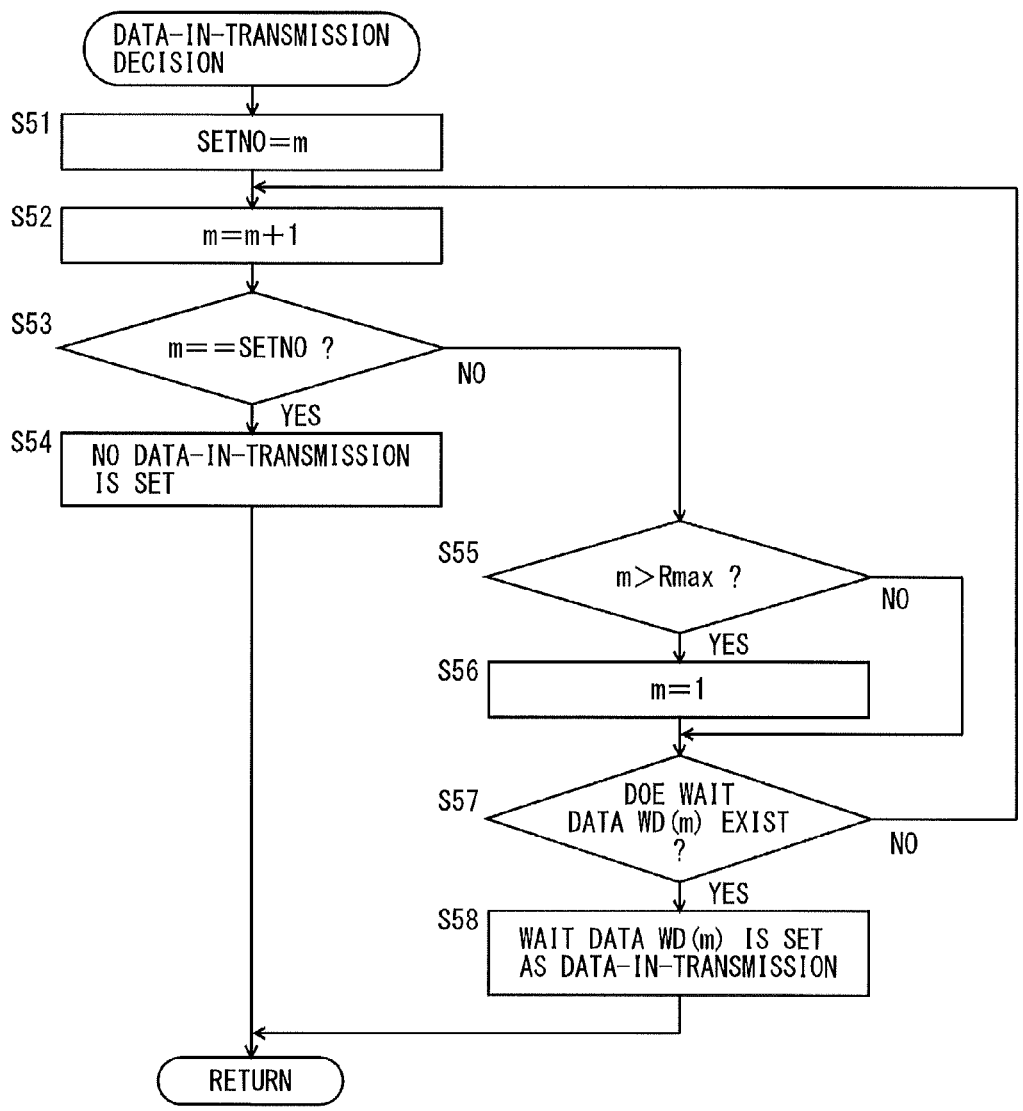
FIG. 10 is a flowchart showing an exemplary flow of a data-in-transmission decision process.

FIG. 10 is a flowchart showing an exemplary flow of the data-in-transmission decision process. The data-in-transmission decision process is a process executed in step S07 in FIG.

7 and is executed after it is determined in step S05 that transmission of data-in-transmission corresponding to the acquisition request having the request number in is completed.

Referring to FIG. 10, CPU 201 sets the value of the variable m for a constant SETNO (step S51). The constant SETNO indicates the request number of the acquisition request corresponding to the data-in-transmission whose transmission is completed at the point of time when transmission of data-in-transmission corresponding to the acquisition request having the request number m is completed. In the next step S52, the variable m is changed to the value incremented by one. Then, it is determined whether the variable m is equal to the constant SETNO (step S53). If the variable m is equal to the constant SETNO, the process proceeds to step S54. If not, the process proceeds to step S55.

In step S55, it is determined whether the variable m is greater than the acquisition request count Rmax. If the variable m is greater than the acquisition request count Rmax, the process proceeds to step S56. If not, step S56 is skipped, and the process proceeds to step S57. In step S56, "1" is set for the variable m. The process then proceeds to step S57.

In step S57, it is determined whether wait data WD(m) exists. If wait data WD(m) exists, the process proceeds to step S59. If not, the process returns to step S52. In step S59, wait data WD(m) corresponding to the acquisition request having the request number m is set as data-in-transmission. The process then returns to the print data transmission process.

The process proceeds to step S54 if there exists no wait data WD(i) (1≤i≤Rmax) corresponding to any of the acquisition requests having the request numbers 1 to Rmax. In step S54, because wait data WD(i) to be set as data-in-transmission does not exist, no data-in-transmission is set. The process then returns to the print data transmission process.

Figure 11:
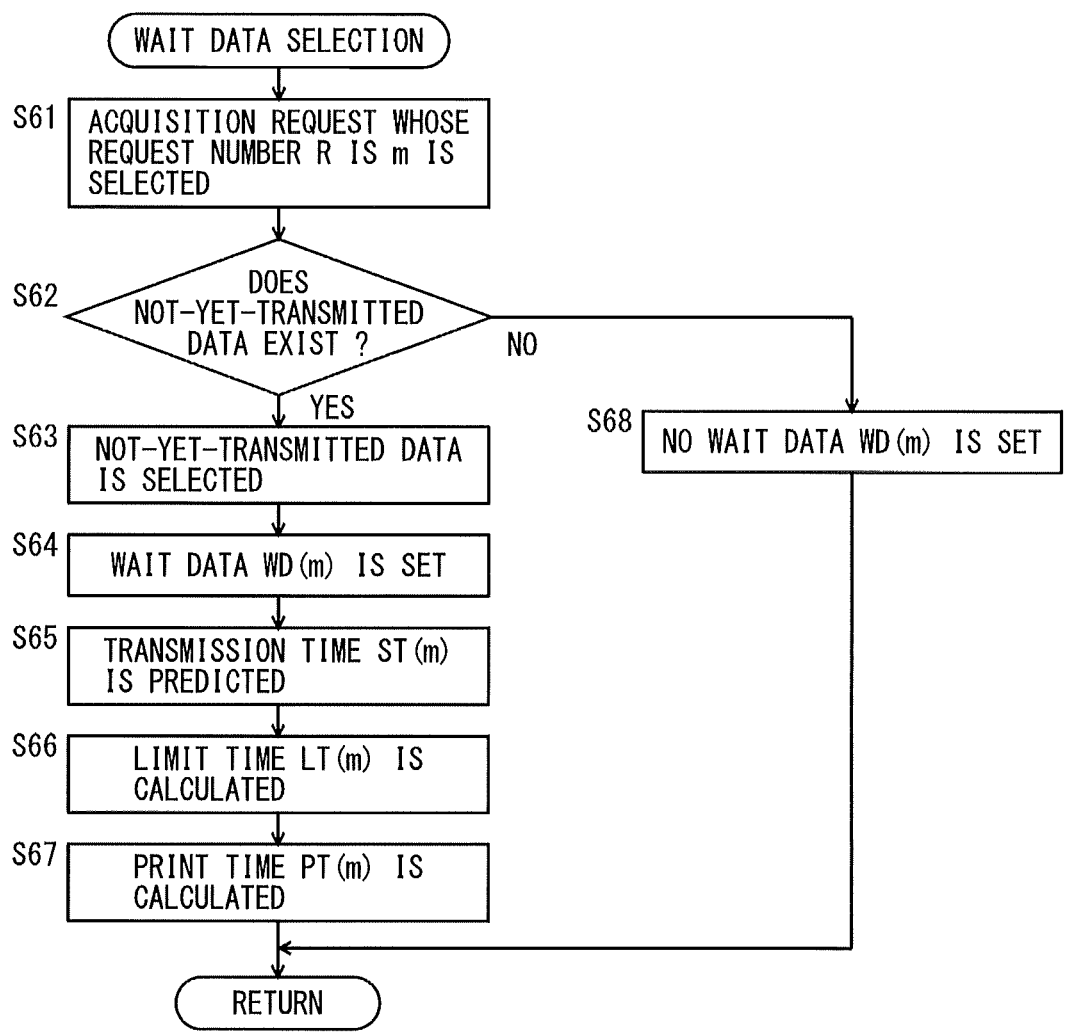
FIG. 11 is a flowchart showing an exemplary flow of a wait data selection process.

FIG. 11 is a flowchart showing an exemplary flow of the wait data selection process. The wait data selection process is a process executed in step S11 in FIG. 7. Referring to FIG. 11, CPU 201 sets the acquisition request whose request number R is m is selected as a process target (step S61). In the next step S62, it is determined whether there exists not-yet-transmitted data among one or more print data corresponding to the acquisition request whose request number R is m. If not-yet-transmitted data exists, the process proceeds to step S63. If none exists, the process proceeds to step S68. In step S68, no wait data WD(m) corresponding to the acquisition request whose request number R is m is set. The process then returns to the print data transmission process.

In step S63, one is selected from one or more not-yet-transmitted data of one or more print data corresponding to the acquisition request whose request number R is m. For example, of one or more not-yet-transmitted data, the one received at the earliest date and time is selected. Then, the selected not-yet-transmitted data is set as wait data WD(m) corresponding to the acquisition request whose request number R is m (step S64).

In step S65, a transmission time ST(m) is predicted. Here, the reception time measured when print data set as wait data WD(m) is received is set as transmission time ST(m). The reception time is associated with the print data and stored in step S23 in FIG. 8.

In the next step S66, a limit time LT(m) is calculated. At a stage before step S67 is executed, the print time PT(m) corresponding to the acquisition request whose request number R is m is set. Specifically, in step S43 of the acquisition request reception process shown in FIG. 9 that is executed at the point of time when the acquisition request whose request number R is m is received, the print time PT(m) of the print data with the highest priority is calculated. The print time PT(m) of the print data with the second and subsequent priorities is calculated in step S67 executed at a stage before step S66 is executed. The print time PT(m) calculated in step S67 executed at a stage before step S66 is executed is the print time PT(m) of the print data set as wait data WD previous to the print data set as wait data WD(m) in step S64. In this manner, the value obtained by subtracting the transmission time ST(m) predicted in step S65 from the already-calculated print time PT(m) is set as the limit time LT(m).

In the next step S67, a new print time PT(m) is calculated. The process then returns to the print data transmission process. Specifically, of MFPs 100, 100A, 100B, the ability information of the apparatus that has transmitted the acquisition request whose request number R is m is acquired, and the print time PT(m) is calculated based on the acquired ability information and the print data set as wait data WD(m). Here, it is assumed that the ability information is the number of sheets printed per predetermined time. The print time PT(m) is calculated by dividing the ability information of the apparatus that has transmitted the acquisition request whose request number R is m, of MFPs 100, 100A, 100B, by the number of sheets of image formation of the print data set as wait data WD(m) in step S65.

Figure 12:
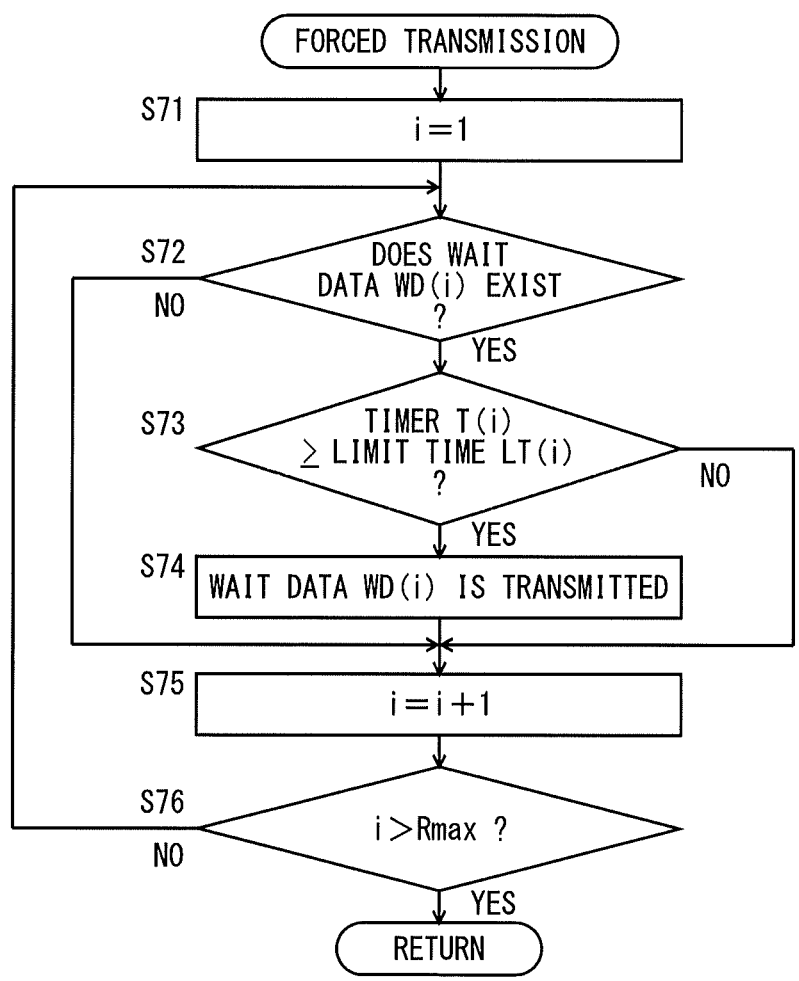
FIG. 12 is a flowchart showing an exemplary flow of a forced transmission process.

FIG. 12 is a flowchart showing an exemplary flow of the forced transmission process. The forced transmission process is a process that is executed in step S13 in FIG. 7. At a stage before the forced transmission process is executed, the timer T(i) (1≤i≤Rmax) corresponding to each of the acquisition requests having the request numbers 1 to Rmax is counted (step S06 or step S39), and the limit time LT(i) (1≤i≤Rmax) is set (step S42 or step S66).

Referring to FIG. 12, CPU 201 sets the initial value "1" for a variable i (step S71). The variable i is used to determine the acquisition request serving as a process target, among the acquisition requests having the request numbers 1 to Rmax.

In the next step S72, it is determined whether wait data WD(i) is set. If wait data WD(i) corresponding to the acquisition request having the request number i is set, the process proceeds to step S73. If not, the process proceeds to step S75.

In step S73, it is determined whether the timer T(i) is equal or greater than the limit time LT(i). If the timer T(i) is equal to or greater than the limit time LT(i), the process proceeds to step S74. If not, the process proceeds to step S75. In step S74, the wait data WD(i) is transmitted. The wait data WD(i) is transmitted to the apparatus that has transmitted the acquisition request whose request number R is i, among MFPs 100, 100A, 100B.

The timer T(i) corresponding to the acquisition request having the request number i indicates the time elapsed since the wait data WD(i) is set without being transmitted. The limit time LT(i) corresponding to the acquisition request having the request number i is the value obtained by subtracting the transmission time ST(i) for transmitting the wait data WD(i) from the print time PT(i) in which print data transmitted previous to the wait data WD(i) is printed, among one or more print data corresponding to the acquisition request having the request number i. When the timer T(i) becomes equal to or greater than the limit time LT(i), the wait data WD(i) is transmitted, so that the print data of the wait data WD(i) can be printed in any one of MFPs 100, 100A, 100B immediately after printing of the print data transmitted previous to the wait data WD(i) is completed. This can minimize the possibility that wait time for the user occurs.

In step S75, the variable i is set to the value incremented by one. The process then proceeds to step S76. In step S76, it is determined whether the variable i is greater than the acquisition request count Rmax. If the variable i is greater than the acquisition request count Rmax, the process returns to the print data transmission process. If not, the process returns to step S72.

Figure 13:
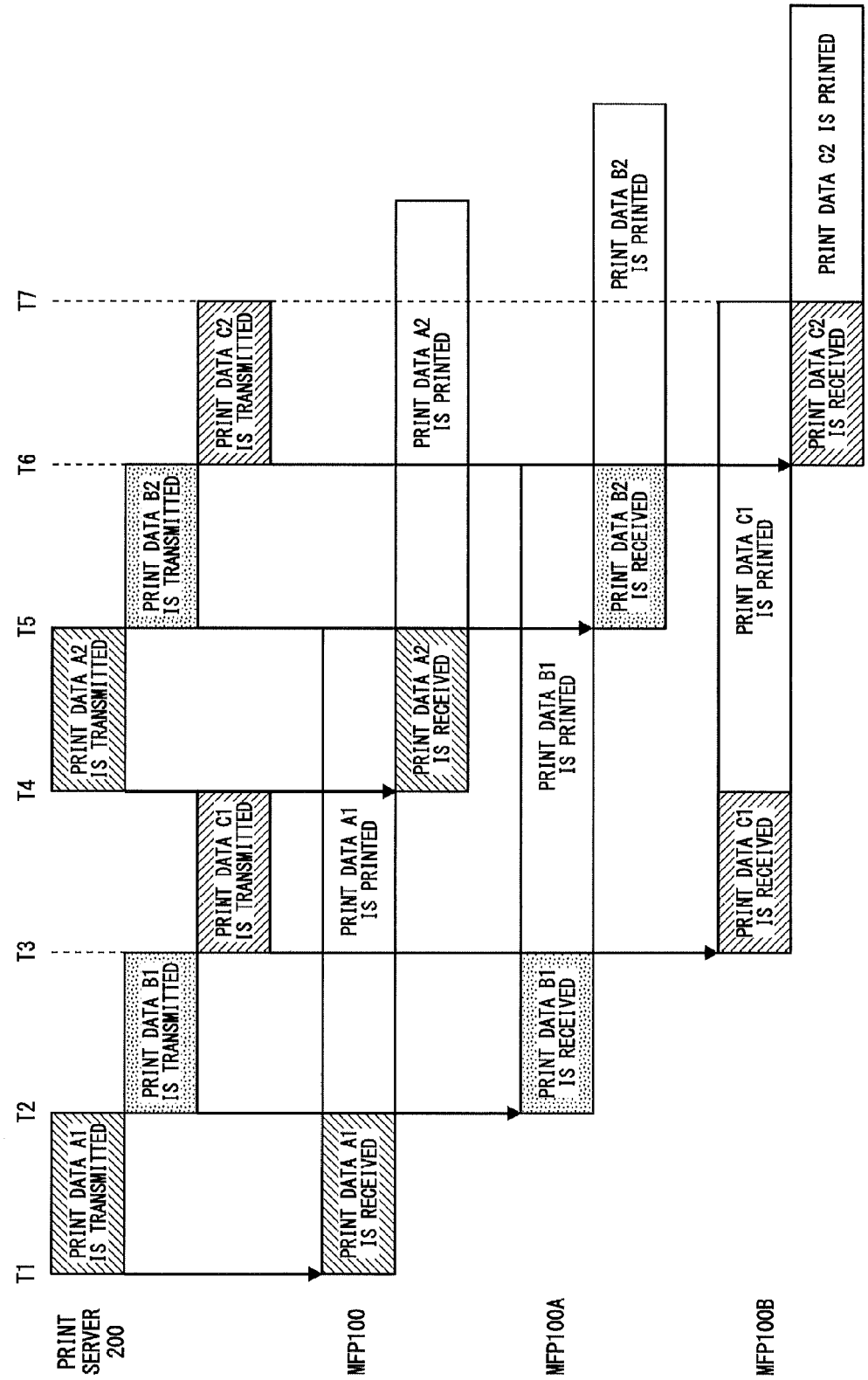
FIG. 13 is a first time chart for explaining timing at which print data is transmitted/received between the print server and the MFP.

FIG. 13 is a first time chart for explaining timing at which print data is transmitted/received between the print server and the MFP. Here, print server 200 receives an acquisition request A from MFP 100, an acquisition request B from MFP 100A, and an acquisition request C from MFP 100B in the order of the acquisition request A, the acquisition request B, and the acquisition request C, by way of example. Two print data A1 and A2 are extracted based on the acquisition request A received from MFP 100, two print data B1 and B2 are extracted based on the acquisition request B received from MFP 100A, and two print data C1 and C2 are extracted based on the acquisition request C received from MFP 100B, by way of example.

Referring to FIG. 13, print server 200 successively transmits print data A1, print data B1, print data C1, print data A2, print data B2, and print data C2 in this order without transmitting two simultaneously. Two or more print data are thus not simultaneously transmitted, thereby preventing increase of load on CPU 201.

In MFP 100, reception of print data A1 starts at time T1, and printing of print data A1 starts at time T2 when reception of print data A1 is completed, and ends at time T5. Reception of print data A2 starts at time T4, and printing of print data A2 starts at time T5 when reception of print data A2 is completed. At time T5 when printing of print data A1 ends, reception of print data A2 has been completed, so that print data A2 can be printed immediately after printing of print data A1 is completed.

In MFP 100A, reception of print data B1 starts at time T2, and printing of print data B1 starts at time T3 when reception of print data B1 is completed, and ends at time T6. Reception of print data B2 starts at time T5, and printing of print data B2 starts at time T6 when reception of print data B2 is completed. At time T6 when printing of print data B1 ends, reception of print data B2 has been completed, so that print data B2 can be printed immediately after printing of print data B1 is completed.

In MFP 100B, reception of print data C1 starts at time T3, and printing of print data C1 starts at time T4 when reception of print data C1 is completed, and ends at time T7. Reception of print data C2 starts at time T6, and printing of print data C2 starts at time T7 when reception of print data C2 is completed. At time T7 when printing of print data C1 ends, reception of print data C2 has been completed, so that print data C2 can be printed immediately after printing of print data C1 is completed.

Figure 14:
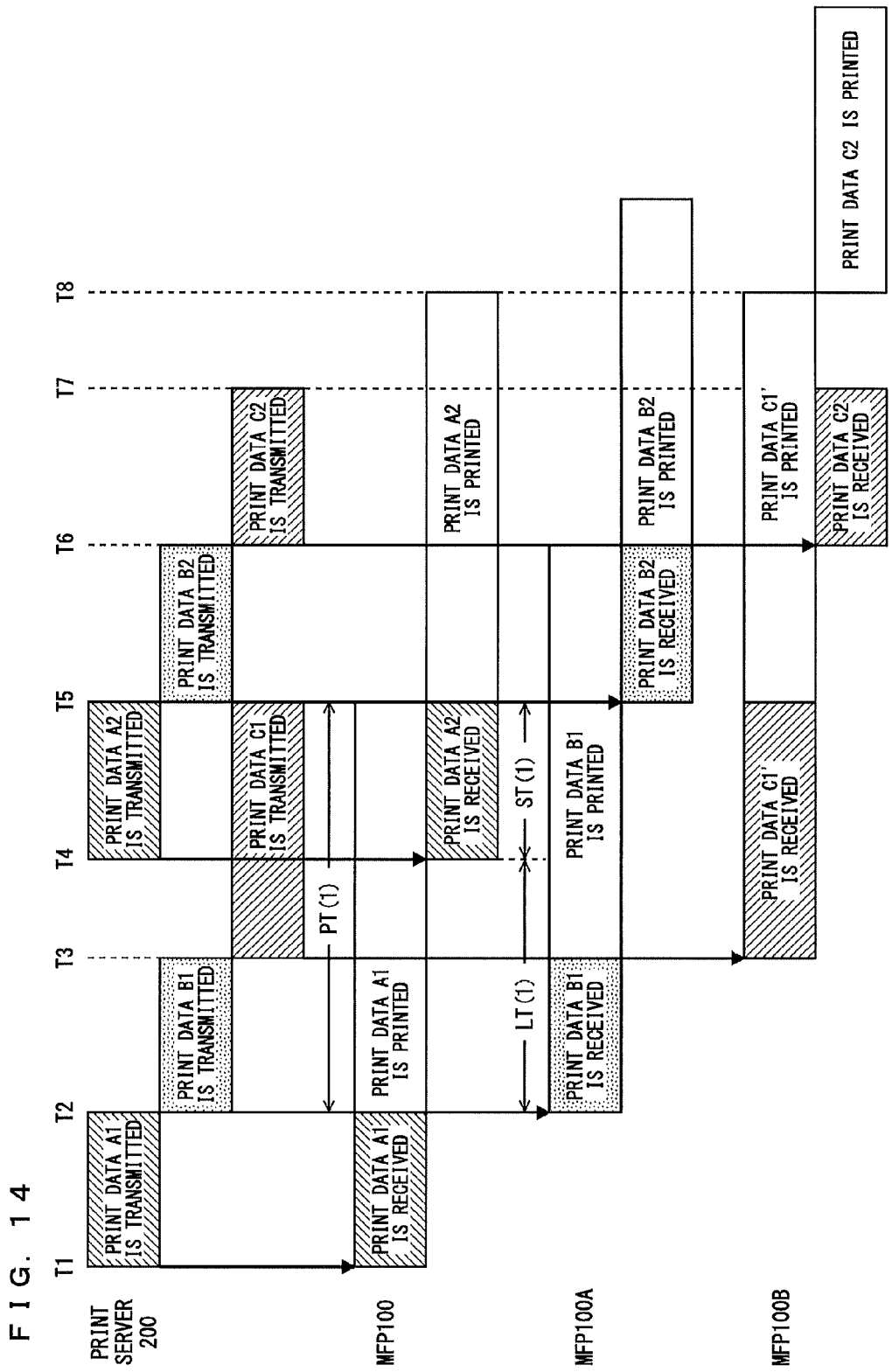
FIG. 14 is a second time chart for explaining timing at which print data is transmitted/received between the print server and the MFP.

FIG. 14 is a second time chart for explaining timing at which print data is transmitted/received between the print server and the MFP. Here, print server 200 receives an acquisition request A from MFP 100, an acquisition request B from MFP 100A, and an acquisition request C' from MFP 100B in the order of the acquisition request A, the acquisition request B, and the acquisition request C', by way of example. Two print data A1 and A2 are extracted based on the acquisition request A received from MFP 100, two print data B1 and B2 are extracted based on the acquisition request B received from MFP 100A, and two print data C1' and C2 are extracted based on the acquisition request C' received from MFP 100B, by way of example.

Referring to FIG. 14, print server 200 successively transmits print data A1, print data B1, and print data C' in this order without transmitting two of them simultaneously.

In MFP 100, reception of print data A1 starts at time T1, and printing of print data A1 starts at time T2 when reception of print data A1 is completed, and ends at time T5.

In MFP 100A, reception of print data B1 starts at time T2, and printing of print data B1 starts at time T3 when reception of print data B1 is completed, and ends at time T6.

In MFP 100B, reception of print data C1' starts at time T3, and printing of print data C1' starts at time T5 when reception of print data C1' is completed, and ends at time T8.

Here, print server 200 transmits print data A2 subsequently to print data C1'. During transmission of print data C1', the elapsed time since completion of transmission of print data A1, in other words, the wait time for print data A2 reaches the wait time limit LT(1) for print data A2. The wait time limit LT(1) is the value obtained by subtracting the transmission time ST(1) for transmitting print data A2 from the print time PT(1) for printing print data A1. Print server 200 therefore transmits print data A2 to MFP 100 at time T4 even when it is transmitting print data C1'. MFP 100 therefore can start reception of print data A2 at time T4 and receive it by time T5, and starts printing of print data A2 at time T5. At time T5 when printing of print data A1 ends, reception of print data A2 has been completed, so that print data A2 can be printed immediately after printing of print data A1 is completed.

Print server 200 is scheduled to subsequently transmit print data A2 at time T5 when transmission of print data C1' is completed. Print server 200, however, starts transmission of print data B2 because transmission of print data A2 has already started. Print server 200 then starts transmission of print data C2 at time T6 when transmission of print data B2 is completed.

In MFP 100A, therefore, reception of print data B2 starts at time T5, and printing of print data B2 starts at time T6 when reception of print data B2 is completed. At time T6 when printing of print data B1 ends, reception of print data B2 has been completed, so that print data B2 can be printed immediately after printing of print data B1 is completed.

In MFP 100B, although print data C1' is being printed, reception of print data C2 transmitted from print server 200 starts at time T6 and ends at time T7 when reception of print data C2 is completed. At time T7, print data C1' is being printed, so that printing of print data C2 starts at time T8 when printing of print data C1' ends. At time T8 when printing of print data C ends, reception of print data C2 has been completed, so that print data C2 can be printed immediately after printing of print data C1' is completed.

As described above, in print system 1 in the present embodiment, print server 200 receives print data from any one of PCs 400, 401, 402 and then temporarily stores print data and user identification information. On the other hand, in response to reception of an acquisition request from any one of MFPs 100, 100A, 100B, print server 200 extracts a set of one or more print data associated with the user identification information included in the acquisition request and successively returns the print data without transmitting two or more simultaneously. If a new acquisition request is received from any one of MFPs 100, 100A, 100B during transmission of print data, print server 200 holds transmission of one or more not-yet-transmitted data of one or more print data included in the same set as the print data-in-transmission, after transmission of the print data-in-transmission is completed. Accordingly, when a new acquisition request is received, the number of print data concurrently transmitted is reduced thereby avoiding increase of load on CPU 201 clue to transmission of print data.

While transmission of one or more not-yet-transmitted data included in the same set as the print data-in-transmission is held after transmission of the print data-in-transmission is completed, one or more print data included in a new set can be transmitted to the MFP that has transmitted the new acquisition request. Accordingly, when print data is transmitted to each of a plurality of MFPs 100, 100A, 100B, delay in transmission of print data caused by increase of load due to transmission of print data can be avoided.

In the case where a plurality of acquisition requests are received from more than one of MFPs 100, 100A, 100B, print server 200 extracts a plurality of sets of one or more print data. Print server 200 selects a transmission target set from the extracted plurality of sets in the order in which the corresponding acquisition requests are received, and holds transmission of one or more not-yet-transmitted data included in the set not selected as a transmission target set. Accordingly, print data is transmitted to a plurality of MFPs 100, 100A, 100B in the order in which the acquisition requests are transmitted, thereby reducing variations in time from transmission of the acquisition request to reception of the initial print data among a plurality of MFPs 100, 100A, 100B.

In the case where a plurality of acquisition requests are received from more than one of MFPs 100, 100A, 100B, print server 200 extracts a plurality of sets of one or more print data and selects a transmission target set from the extracted plurality of sets in the order in which the corresponding acquisition requests are received. Print server 200 holds transmission of one or more not-yet-transmitted data included in the set not selected as a transmission target set among the plurality of sets until transmission of one of one or more not-yet-transmitted data included in the transmission target set is completed. Accordingly, print data can be transmitted in a time-division manner to a plurality of MFPs 100, 100A, 100B. In each of a plurality of MFPs 100, 100A, 100B, delay in time from transmission of a request to reception of the initial print data can be avoided.

When the time during which transmission of print data is held becomes equal to or greater than the wait time limit, print server 200 forcedly transmits the print data whose transmission is held. Accordingly, in all the apparatuses that have transmitted the acquisition requests, among a plurality of MFPs 100, 100A, 100B, images of a plurality of print data can be formed in succession.

When, of a plurality of MFPs 100, 100A, 100B, the apparatus that has transmitted an acquisition request enters a state in which an image cannot be formed, print server 200 holds transmission of print data to the apparatus in the state in which an image cannot be formed, and does not transmit print data. Accordingly, print data is transmitted preferentially to the apparatus in a state in which an image can be formed, of the apparatuses that have transmitted the acquisition requests among MFPs 100, 100A, 100B.

<First Modification>

Figure 15:
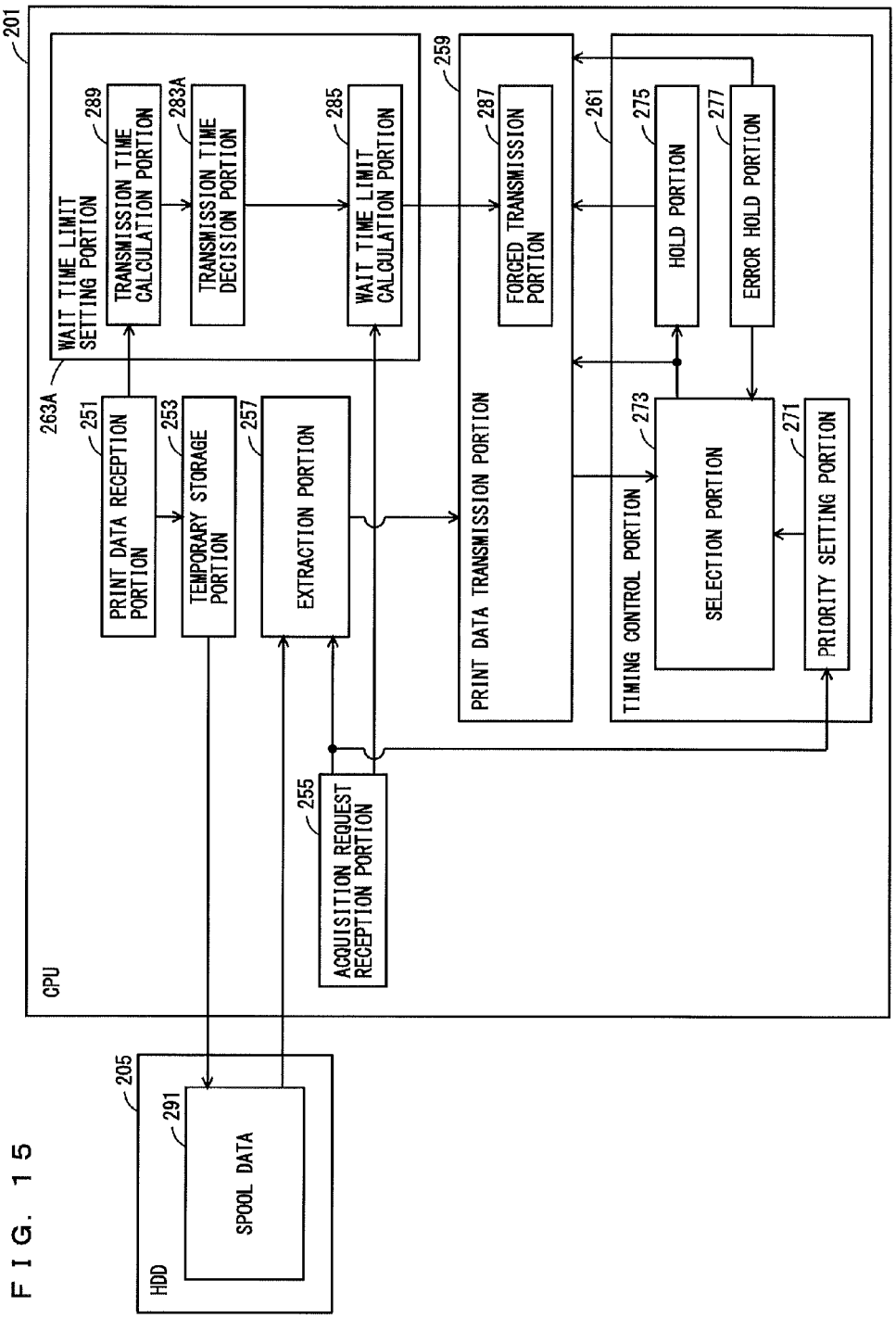
FIG. 15 is a block diagram showing an example of functions of the CPU of the print sever according to a first modification.

In the first modification, wait time limit setting portion 263, which is a function formed in CPU 201, is modified in print server 200 as described above. FIG. 15 is a block diagram showing an example of functions of the CPU of the print sever according to the first modification. Referring to FIG. 15, the functions of CPU 201 differ from those in FIG. 5 in that wait time limit setting portion 263 is changed to a wait time limit setting portion 263A. The other functions are the same as the functions shown in FIG. 5, and a description thereof will not be repeated here.

Referring to FIG. 15, wait time limit setting portion 263A includes a transmission time calculation portion 289, a transmission time decision portion 283A, and a wait time limit time calculation portion 285. Transmission time calculation portion 289 receives print data identification information from print data reception portion 251. Transmission time calculation portion 289 calculates the transmission time based on transmission ability predetermined for network I/F 204 to transmit data and data of print data specified by the print data identification information. For example, assuming that the transmission ability is the data volume that can be transmitted per unit time, the transmission time is the value obtained by dividing the data volume of the print data by the transmission ability. Transmission Lime calculation portion 289 outputs a set of the print data identification information and the calculated transmission time to transmission time decision portion 283A.

Transmission time decision portion 283A decides the transmission time input from transmission time calculation portion 289, as the transmission time of the print data specified by the print data identification information that makes a set therewith, and outputs a set of the transmission time and the print data identification information to wait time limit calculation portion 285.

<Second Modification>

In the foregoing embodiment, print server 200 transmits print data to a predetermined one of MFPs 100, 100A, 100B. Specifically, print data transmission portion 259 basically transmits print data to one apparatus determined by timing control portion 261 from among MFPs 100, 100A, 100B.

Print server 200 in the second modification performs a process of transmitting print data concurrently to up to a predetermined number of apparatuses of MEPs 100, 100A, 100B, where the predetermined number is equal to or greater than two. The predetermined number can be set as desired depending on, for example, the processing ability of CPU 201 or the transmission speed of network I/F 204. In this case, timing control portion 261 selects a predetermined number of apparatuses from MFPs 100, 100A, 100B. Accordingly, in CPU 201 in the second modification, print data transmission portion 259 concurrently executes a process of transmitting respective print data to a predetermined number of apparatuses selected by timing control portion 261 from among MFPs 100, 100A, 100B.

In the case where a plurality of acquisition requests are received from more than one of MFPs 100, 100A, 100B, print server 200 in the second modification extracts a plurality of sets of one or more print data and selects a transmission target set from the extracted plurality of sets in the order in which the corresponding acquisition requests are received, wherein print server 200 holds transmission of one or more not-yet-transmitted data included in the set not selected among up to the predetermined number of apparatuses of the plurality of sets until transmission of one of one or more not-yet-transmitted data included in any one of up to a predetermined number of transmission target sets is completed. Accordingly, print data can be transmitted concurrently to up to a predetermined number of apparatuses among a plurality of MFPs 100, 100A, 100B. The number of apparatuses to which print data is concurrently transmitted is restricted to a predetermined number among MFPs 100, 100A, 100B, so that the upper limit of load on CPU 201 in transmitting print data can be set, thereby preventing load from unlimitedly increasing. In addition, delay in time from transmission of a request to reception of the initial print data can be avoided in each of MFPs 100, 100A, 100B.

Although print system 1 has been described in the foregoing embodiment, it is needless to say that the invention can be understood as a print data transmission method that allows print server 200 to execute the print data transmission process shown in FIG. 7 to FIG. 11 or a program that allows CPU 201 controlling print server 200 to execute the print data transmission method.

Although the present invention has been described and illustrated in detail, it is clearly understood that the same is by way of illustration and example only and is not to be taken by way of limitation, the spirit and scope of the present invention being limited only by the terms of the appended claims.

<Notes>

(1) The print server according to claim 6, wherein the wait time limit setting means further includes reception time acquisition means for acquiring a reception time during which the print data reception means is receiving print data for each of the respective one or more print data included in the plurality of sets, and the transmission time decision means decides the reception time acquired corresponding to the print data as a transmission time.

(2) The print server according to claim 6, wherein the wait time limit setting means further includes transmission time calculation means for calculating the transmission time, for each of the respective one or more print data included in the plurality of sets, based on a data volume of the print data and a communication speed for data communication.

What is claimed is:

1. A print server comprising:
   a temporary storage portion to temporarily store print data; and
   a processor configured to:
   externally receive print data;
   extract a set of one or more print data serving as a transmission target from the temporarily stored print data in response to reception of a request from any one of a plurality of image forming apparatuses;
   successively transmit one or more print data included in the extracted set without transmitting two or more print data in the extracted set simultaneously to a requestor apparatus that has transmitted the request among the plurality of image forming apparatuses;
   control timing for transmitting respective one or more print data included in a plurality of sets of one or more print data when the plurality of sets are extracted while print data is being transmitted;
   when there exists one or more not-yet-transmitted data that has not yet been transmitted among one or more print data included in a same set as the print data being transmitted, hold transmission of the one or more not-yet-transmitted data included in the same set as the print data being transmitted until after transmission of the print data being transmitted is completed; and
   transmit one or more print data included in a different one of the plurality of sets, while the transmission of the one or more not-yet-transmitted data included in the same set is holding, to another requestor apparatus that has transmitted a request among the plurality of image forming apparatuses.

2. The print server according to claim 1,
   the processor further configured to:
   decide respective priorities corresponding to the plurality of sets that are extracted, based on order in which requests corresponding to the plurality of sets are received,
   select a transmission target set serving as a target to be transmitted from among the plurality of sets that are extracted, in accordance with the priority, and
   hold transmission of one or more not-yet-transmitted data included in a set not selected as the transmission target set from among the plurality of sets.

3. The print server according to claim 2, wherein the processor holds transmission of one or more not-yet-transmitted data included in a set not selected as the transmission target set from among the plurality of sets until transmission of one of one or more not-yet-transmitted data included in the transmission target set is completed.

4. The print server according to claim 3, wherein
   the processor selects up to a predetermined number of transmission target sets from the plurality of sets, where the predetermined number is equal to or greater than two, and
   the processor holds transmission of one or more not-yet-transmitted data included in a set not selected among up to the predetermined number of transmission target sets selected from among the plurality of sets until transmission of one of one or more not-yet-transmitted data included in any one of up to the predetermined number of selected transmission target sets is completed.

5. The print server according to claim 1, wherein the processor is further configured to:
   set a wait time limit for each of the plurality of sets, and
   if, in each of the plurality of sets, a time during which transmission is held becomes equal to or greater than a wait time limit set for the set, transmit one of one or more not-yet-transmitted data whose transmission is held, even if the set is not selected as the transmission target set.

6. The print server according to claim 5,
   wherein the processor is further configured to:
   decide a transmission time required for transmission for each of the respective one or more print data included in the plurality of sets, and
   calculate, for each of the respective one or more print data included in the plurality of sets, the wait time limit based on the transmission time of the print data, image forming ability of an image forming apparatus that has transmitted a request corresponding to a set that includes the print data, and a number of sheets for image forming of print data with a priority one level higher than the print data.

7. The print server according to claim 1, wherein the processor is further configured to, if any one of the plurality of image forming apparatuses enters a state in which an image cannot be formed, hold transmission of one or more not-yet-transmitted data included in a set corresponding to a request received from the image forming apparatus that enters the state in which an image cannot be formed.

8. A print data transmission method comprising:
   a print data reception step of externally receiving print data;
   a temporary storage step of temporarily storing the received print data;
   an extraction step of, in response to reception of a request from any one of a plurality of image forming apparatuses, extracting a set of one or more print data serving as a transmission target from the temporarily stored print data based on the request;
   a print data transmission step of successively transmitting one or more print data included in the extracted set without transmitting two or more print data in the extracted set simultaneously to a requestor apparatus that has transmitted the request among the plurality of image forming apparatuses;
   a timing control step of, when a plurality of sets are extracted in the extraction step while print data is being transmitted in the print data transmission step, controlling timing for transmitting respective one or more print data included in the plurality of sets, the timing control step including a hold step wherein when there exists one or more not-yet-transmitted data that has not yet been transmitted among one or more print data included in a same set as the print data being transmitted, transmission of the one or more not-yet-transmitted data included in the same set as the print data being transmitted is held until after transmission of the print data being transmitted is completed; and the print data transmission step including transmitting one or more print data included in a different one of the plurality of sets, while the transmission of the one or more not-yet-transmitted data included in the same set is being held, to another requestor apparatus that has transmitted a request among the plurality of image forming apparatuses.

9. The print data transmission method according to claim 8, the timing control step further including a priority decision step of deciding respective priorities corresponding to the plurality of sets extracted in the extraction step, based on order in which requests corresponding to the plurality of sets are received, and a selection step of selecting a transmission target set serving as a target to be transmitted from among the plurality of sets extracted in the extraction step, in accordance with the priority, wherein the hold step includes a step of holding transmission of one or more not-yet-transmitted data included in a set not selected as the transmission target set from among the plurality of sets.

10. The print data transmission method according to claim 9, wherein the hold step includes a step of holding transmission of one or more not-yet-transmitted data included in a set not selected as the transmission target set from among the plurality of sets until transmission of one of one or more not-yet-transmitted data included in the transmission target set is completed.

11. The print data transmission method according to claim 10, wherein the selection step includes a step of selecting up to a predetermined number of transmission target sets from the plurality of sets, where the predetermined number is equal to or greater than two, and the hold step includes a step of holding transmission of one or more not-yet-transmitted data included in a set not selected among up to the predetermined number of transmission target sets selected from among the plurality of sets until transmission of one of one or more not-yet-transmitted data included in any one of up to the predetermined number of selected transmission target sets is completed.

12. The print data transmission method according to claim 8, further comprising a wait time limit setting step of setting a wait time limit for each of the plurality of sets, the print data transmission step including a forced transmission step wherein if, in each of the plurality of sets, a time during which transmission is held in the hold step becomes equal to or greater than a wait time limit set for the set, one of one or more not-yet-transmitted data whose transmission is held in the hold step is transmitted even if the set is not selected as the transmission target set in the selection step.

13. The print data transmission method according to claim 12, the wait time limit setting step including a transmission time decision step of deciding a transmission time required for transmission for each of the respective one or more print data included in the plurality of sets, and a wait time limit calculation step of calculating, for each of the respective one or more print data included in the plurality of sets, the wait time limit based on the transmission time of the print data, image forming ability of an image forming apparatus that has transmitted a request corresponding to a set that includes the print data, and a number of sheets for image forming of print data with a priority one level higher than the print data.

14. The print data transmission method according to claim 8, further comprising an error hold step of, if any one of the plurality of image forming apparatuses enters a state in which an image cannot be formed, holding transmission of one or more not-yet-transmitted data included in a set corresponding to a request received from the image forming apparatus that enters the state in which an image cannot be formed.

15. A non-transitory computer-readable recording medium encoded with a print data transmission program performed by a computer controlling a print server, the print data transmission program causing the computer to execute:

a print data reception step of externally receiving print data;

a temporary storage step of temporarily storing the received print data;

an extraction step of, in response to reception of a request from any one of a plurality of image forming apparatuses, extracting a set of one or more print data serving as a transmission target from the temporarily stored print data based on the request;

a print data transmission step of successively transmitting one or more print data included in the extracted set without transmitting two or more print data in the extracted set simultaneously to a requestor apparatus that has transmitted the request among the plurality of image forming apparatuses;

a timing control step of, when a plurality of sets are extracted in the extraction step while print data is being transmitted in the print data transmission step, controlling timing for transmitting respective one or more print data included in the plurality of sets, the timing control step including a hold step wherein when there exists one or more not-yet-transmitted data that has not yet been transmitted among one or more print data included in a same set as the print data being transmitted, transmission of the one or more not-yet-transmitted data included in the same set as the print data being transmitted is held until after transmission of the print data being transmitted is completed; and the print data transmission step including transmitting one or more print data included in a different one of the plurality of sets, while the transmission of the one or more not-yet-transmitted data included in the same set is being held, to another requestor apparatus that has transmitted a request among the plurality of image forming apparatuses.

* * * * *